US012435147B2

(12) United States Patent
Kerrouche et al.

(10) Patent No.: US 12,435,147 B2
(45) Date of Patent: Oct. 7, 2025

(54) NEMOLIZUMAB IN THE TREATMENT OF ATOPIC DERMATITIS WITH MODERATE TO SEVERE EXCORIATION

(71) Applicants: GALDERMA HOLDING SA, La Tour-De-Peilz (CH); Chugai Seiyaku Kabushiki Kaisha, Tokyo (JP)

(72) Inventors: Nabil Kerrouche, Le Rouret (FR); Keiko Hirokawa, Tokyo (JP); Ryosuke Mihara, Tokyo (JP)

(73) Assignees: Galderma Holding SA, Zug (CH); Chugai Seiyaku Kabushiki Kaisha, Tokyo (JP)

( * ) Notice: Subject to any disclaimer, the term of this patent is extended or adjusted under 35 U.S.C. 154(b) by 231 days.

(21) Appl. No.: 16/988,554

(22) Filed: Aug. 7, 2020

(65) Prior Publication Data

US 2020/0385476 A1 Dec. 10, 2020

Related U.S. Application Data

(63) Continuation of application No. PCT/IB2019/051051, filed on Feb. 8, 2019.

(60) Provisional application No. 62/628,714, filed on Feb. 9, 2018.

(51) Int. Cl.
| | |
|---|---|
| *A61K 39/395* | (2006.01) |
| *A61K 9/00* | (2006.01) |
| *A61P 17/00* | (2006.01) |
| *C07K 16/28* | (2006.01) |
| *A61K 39/00* | (2006.01) |

(52) U.S. Cl.
CPC ........ *C07K 16/2866* (2013.01); *A61K 9/0014* (2013.01); *A61K 9/0019* (2013.01); *A61P 17/00* (2018.01); *A61K 39/395* (2013.01); *A61K 2039/545* (2013.01)

(58) Field of Classification Search
None
See application file for complete search history.

(56) References Cited

U.S. PATENT DOCUMENTS

| | | | | |
|---|---|---|---|---|
| 9,334,331 | B2 * | 5/2016 | Igawa | C07K 16/36 |
| 10,421,807 | B2 * | 9/2019 | Gonzales | A61P 17/08 |
| 10,544,227 | B2 * | 1/2020 | Kaneko | A61K 45/00 |
| 2011/0117052 | A1 * | 5/2011 | Bilsborough | C07K 14/7155 |
| | | | | 424/85.2 |
| 2018/0079817 | A1 * | 3/2018 | Kaneko | C07K 16/28 |

FOREIGN PATENT DOCUMENTS

| | | |
|---|---|---|
| CA | 2980992 A1 | 10/2016 |
| EP | 0 584 81 A1 | 8/1982 |
| EP | 0 133 988 A2 | 3/1985 |
| JP | 2008-530132 A | 8/2008 |
| TW | 201642905 | 12/2016 |
| WO | WO-98/46777 | 10/1998 |
| WO | WO-00/75314 | 12/2000 |
| WO | WO-2010/064697 A1 | 6/2010 |
| WO | WO-2016167263 A1 * 10/2016 ........... A61K 39/395 |
| WO | WO-2017/093857 A1 | 6/2017 |

OTHER PUBLICATIONS

Kabashima et al. Humanized anti-interleukin-31 receptor A antibody nemolizumab (CIM331) suppresses pruritus and improves eczema in patients with moderate-to-severe atopic dermatitis. Journal of Investigative Dermatology, vol. 136, No. 9, Suppl. 2, pp. S161. Abstract 005. Meeting: Sep. 7, 2016. (Year: 2016).*
Rabia, et al. Understanding and overcoming trade-offs between antibody affinity, specificity, stability and solubility. Biochemical Engineering Journal 137:365-374; (2018) . (Year: 2018).*
Poosarla et al. (Computational De Novo Design of Antibodies Binding to a Peptide With High Affinity. Biotechn. Bioeng. 114(6): 1331-1342; (2017). (Year: 2017).*
Khan et al. Adjustable locks and flexible keys: plasticity of epitope-paratope interactions in germline antibodies. J. Immunol. 192: 5398-5405; (2014). (Year: 2014).*
Goel et al. Plasticity within the antigen-combining site may manifest as molecular mimicry in the humoral immune response. J. Immunol. 173: 7358-7367; (2004). (Year: 2004).*
Lloyd et al. Modelling the human immune response: performance of a 10(11) human antibody repertoire against a broad panel of therapeutically relevant antigens. Protein Engineering, Eng. Design & Selection 22(3): 159-168; (2009) (Year: 2009).*
Edwards et al. The remarkable flexibility of the human antibody repertoire; isolation of over one thousand different antibodies to a single protein, BLyS. Journal of Molecular Biology 334:103-118; (2003). (Year: 2003).*
Al Qaraghuli et al. Antibody-protein binding and conformational changes: identifying allosteric signalling pathways to engineer a better effector response. Nature Scientific Reports 10:13969, (2020). (Year: 2020).*
Michels et al. A blinded, randomized, placebo-controlled, dose determination trial of lokivetmab (ZTS-00103289), a caninized, anti-canine IL-31 monoclonal antibody in client owned dogs with atopic dermatitis. Vet Dermatol vol. 27: 478-e129, (2016). (Year: 2016).*
Saito et al. Dosage Optimization of Nemolizumab Using Population Pharmacokinetic and Pharmacokinetic-Pharmacodynamic Modeling and Simulation. Abstract. Journal of clinical pharmacology, vol. 57, No. 12, pp. 1564-1572. (Electronic Publication Date: Jul. 13, 2017)(Dec. 2017). (Year: 2017).*

(Continued)

*Primary Examiner* — Elizabeth C. Kemmerer
*Assistant Examiner* — Regina M DeBerry
(74) *Attorney, Agent, or Firm* — Sunit Talapatra; Foley & Lardner LLP

(57) ABSTRACT

Disclosed herein are methods for selectively treating atopic dermatitis (AD) in a subject having skin excoriations, pharmaceutical compositions for use in the treatment of atopic dermatitis in a subject having skin excoriations, uses of nemolizumab or an equivalent thereof in the manufacture of a medicament for the treatment of atopic dermatitis in a subject having skin excoriations, and methods of identifying a subject having atopic dermatitis that is likely to respond to nemolizumab treatment or an equivalent thereof.

14 Claims, 8 Drawing Sheets

Specification includes a Sequence Listing.

(56) References Cited

OTHER PUBLICATIONS

Furue et al. Humanized anti-interleukin-31 receptor A antibody nemolizumab (CIM331) suppresses pruritus and improves eczema in patients with moderate-to-severe atopic dermatitis. Journal of Investigative Dermatology, vol. 136, No. 9, Supp. Supplement 2, pp. S161. Abstract No. 005 (Sep. 2016). (Year: 2016).*
Slavyanskaya et al. Prediction of infectious complications in children with atopic dermatitis. Journal of Allergy and Clinical Immunology, vol. 139, No. 2, Supp. Supplement 1, pp. AB243. Abstract No. 761.Annual Meeting of the American Academy of Allergy, Asthma and Immunology, AAA (Year: 2017).*
Furue, M., et al., "Emerging role of interleukin-31 and interleukin-31 receptor in pruritus in atopic dermatitis," Allergy, vol. 73, No. 1, (2017), pp. 29-36, XP055588801, UK ISSN: 0105-4538, DOI: 10.1111/all.13239.
International Search Report and Written Opinion issued in International Application No. PCT/IB2019/051051 Dtd May 29, 2019 (15 pages).
Kabashima, K., et al., "Nemolizumab in patients with moderate-to-severe atopic dermatitis: Randomized, phase II, long-term extension study," Journal of Allergy and Clinical Immunology, Elsevier, Amsterdam, NL, vol. 142, No. 4, (2018), p. 1121, XP085496774, ISSN: 0091-6749, DOI: 10.1016/J.JACI.2018.03.018.
Kasutani, K, et al. (2014) "Anti-IL-31 receptor antibody is shown to be a potential therapeutic option for treating itch and dermatitis in mice," British J. of Pharm., 171: 5049-58.
Nemoto, O., et al., "The first trial of CIM331, a humanized antihuman interleukin-31 receptor A antibody, in healthy volunteers and patients with atopic dermatitis to evaluate safety, tolerability and pharmacokinectics of a single dose in a randomized, double-blind, placebo-co," British Journal of Dermatology, vol. 174, No. 2, (2015), pp. 296-304, XP055517114, UK ISSN: 0007-0963, DOI: 10.1111/bjd.14207.
Oyama, S., et al., "Cynomolgus monkey model of interleukin-31-induced scratching depicts blockade of human interleukin-31 receptor A by a humanized monoclonal antibody," Experimental Dermatology, vol. 27, No. 1, (2017), pp. 14-21, XP55588986, DK ISSN: 0906-6705, DOI: 10.1111/exd.13236.
Ruzicka, T., et al., "Anti-Interleukin-31 Receptor A Antibody for Atopic Dermatitis," New England Journal of Medicine, vol. 376, No. 9, (2017), pp. 826-835, XP009195193, ISSN: 0028-4793, DOI: 10.1056/NEJM0A1606490.
Ruzicka, T., et al., "Supplementary Appendix of: Anti-Interleukin-31 Receptor A Antibody for Atopic Dermatitis," New England Journal of Medicine, vol. 376, No. 9, (2017), 22 pages, XP055588908, US ISSN: 0028-4793, DOI: 10.1056/NEJMoa1606490.
Galfre and Milstein, "Preparation of Monoclonal Antibodies: Strategies and Procedures", Methods in Enzymology, vol. 73, 1981 (pp. 3-46).
Robinson et al., "Complete amino acid sequence of a mouse immunoglobulin alpha chain (MOPC 511)," PNAS vol. 77, No. 8, 1980, (pp. 4909-4913).
Rutishauser et al., "Amino acid sequence of the Fc region of a human gamma G-immunoglobulin" PNAS vol. 61, No. 4, 1968 (pp. 1414-1421).
Shinoda et al., "Complete amino acid sequence of the Fc region of a human delta chain," PNAS vol. 78, No. 2., 1981 (pp. 785-789).
Stalder et al., "Severity Scoring of Atopic Dermatitis: The SCORAD Index Consensus Report of the European Task Force on Atopic Dermatitis," Dermatology vol. 186, 1993 (pp. 23-31).
Woods, "Overview of Atopic Dermatitis," American Journal of Managed Care Supplement, vol. 23, No. 8, 2017 (pp. S115-S123).
Office Action issued in Japanese Patent Application No. 2020-542801 dated Nov. 28, 2022 with English machine translation (10 pages).
Raap et al. (2008) "Correlation of IL-31 serum levels with severity of atopic dermatitis" Journal of Allergy and Clinical Immunology; Letters to the Editor, 122(2), pp. 421-423.
Raap et al. (2012) IL-31 significantly correlates with disease activity and Th2 cytokine levels in children with atopic dermatitis Pediatric allergy and immunology: official publication of the European Society of Pediatric Allergy and Immunology, 23(3), 285-288.
Saeki et al (2016) "Clinical practice guidelines for the management of atopic dermatitis 2016" The Japanese Journal of Dermatology, 126(2), p. 121-155, English abstract only.

* cited by examiner

Mild (score = 1)

Moderate (score = 2)

Severe (score = 3)

None (score = 0)

Mild (score = 1)

Moderate (score = 2)

Severe (score = 3)

None (score = 0)

Mild (score = 1)

Moderate (score = 2)

Severe (score = 3)

NEMOLIZUMAB IN THE TREATMENT OF ATOPIC DERMATITIS WITH MODERATE TO SEVERE EXCORIATION

CROSS-REFERENCE TO RELATED APPLICATIONS

This application is a continuation of International Application No. PCT/IB2019/051051, filed Feb. 8, 2019, which claims priority under 35 U.S.C. § 119(e) to U.S. Provisional Application 62/628,714 filed Feb. 9, 2018, both of which are hereby incorporated by reference herein in their entireties.

SEQUENCE LISTING

The instant application contains a Sequence Listing which has been submitted electronically in ASCII format and is hereby incorporated by reference in its entirety. Said ASCII copy, created on Aug. 7, 2020, is named 105153-0703_SL.txt and is 30 KB in size.

FIELD

Described herein are methods for selectively treating atopic dermatitis (AD) in a subject having skin excoriations, pharmaceutical compositions for use in the treatment of atopic dermatitis in a subject having skin excoriations, uses of nemolizumab or an equivalent thereof in the manufacture of a medicament for the treatment of atopic dermatitis in a subject having skin excoriations, and methods of identifying a subject having atopic dermatitis that is likely to respond to nemolizumab treatment or an equivalent thereof.

BACKGROUND

The following discussion is provided to aid the reader in understanding the disclosure and is not admitted to describe or constitute prior art thereto.

Atopic dermatitis ("AD," also known as atopic eczema) is a chronic inflammation of the skin that can result in itchy (pruritic), swollen, red, and/or cracked skin. AD can be triggered by an immune response to antigens, irritants, or mechanical irritation. AD patients with pruritus may exhibit behaviors such as skin scratching or skin massage. In some cases, AD patients with pruritus may abstain from massaging or scratching. Persistent skin scratching can lead to exacerbation of AD, interruption of sleep, and a negative effect on a patient's psychosocial well-being. Some AD patients have pruritus even if other symptoms are effectively managed through treatment.

Approved treatments for pruritus include topical glucocorticoids and antihistamines, but their effects in AD patients are limited and/or associated with significant side effects. Approved treatments for AD include calcineurin inhibitors, emollients, and topical glucocorticoids. However, these treatments have limited efficacy among AD patients with moderate-to-severe AD. Although oral antihistamines are frequently prescribed for atopic dermatitis, such drugs have little to no effect in relieving pruritus. Nemolizumab (CIM331) is a humanized monoclonal antibody that binds to interleukin-31 receptor A (IL-31RA) on cells, including neurons, to inhibit interleukin-31 signaling. Interleukin-31 is thought to play a role in the pathogenesis of AD and therefore may be effective in treating AD. However, there remains a need to develop novel therapeutic regimes to treat patients with AD, particularly those suffering from excoriations or difficulty sleeping, and for identify patients that are likely to respond to AD treatment.

SUMMARY

Provided herein are methods for selectively treating atopic dermatitis (AD) in a subject having skin excoriations, pharmaceutical compositions for use in the treatment of atopic dermatitis in a subject having one or more skin excoriations, uses of nemolizumab or an equivalent thereof in the manufacture of a medicament for the treatment of atopic dermatitis in a subject having skin excoriations, and methods of identifying a subject having atopic dermatitis that is likely to respond to nemolizumab treatment or an equivalent thereof.

In accordance with some embodiments, there are provided methods of selectively treating atopic dermatitis in a subject having skin excoriations, the method comprising, consisting of, or consisting essentially of administering an effective amount of nemolizumab or an equivalent thereof to the subject.

In some embodiments of the methods, the skin excoriations are moderate to severe. In some embodiments of the methods, the effective amount of nemolizumab or the equivalent thereof ranges from about 0.01 mg/kg to about 0.1 mg/kg, about 0.1 mg/kg to about 0.5 mg/kg, about 0.5 mg/kg to about 1.5 mg/kg, about 1.5 mg/kg to about 2.5 mg/kg, or about 2.5 mg/kg to about 10 mg/kg. In particular embodiments, the effective amount of nemolizumab or the equivalent thereof is about 0.1 mg/kg, about 0.5 mg/kg, about 1 mg/kg, about 1.5 mg/kg, about 2 mg/kg, or about 2.5 mg/kg. In some embodiments of the methods, the nemolizumab or the equivalent thereof is administered by a topical or parenteral route. In some embodiments of the methods, the nemolizumab or the equivalent thereof is administered subcutaneously. In some embodiments, the nemolizumab or the equivalent thereof is administered once per week, once every two weeks, once every three weeks, once every four weeks, once every five weeks, once every six weeks, once every seven weeks, or once every eight weeks.

In accordance with some embodiments, there are provided pharmaceutical compositions for use in the treatment of atopic dermatitis in a subject, wherein the subject has been determined to have one or more skin excoriations, the composition comprising, consisting of, or consisting essentially of nemolizumab or an equivalent thereof.

In some embodiments of the pharmaceutical compositions, the skin excoriations are moderate to severe. In some embodiments, the pharmaceutical composition further comprises a carrier. In some embodiments, the carrier is a pharmaceutically acceptable carrier.

In accordance with some embodiments, there are provided uses of nemolizumab or an equivalent thereof in the manufacture of a medicament for the treatment of atopic dermatitis in a subject having one or more skin excoriations. In some embodiments, the skin excoriations are moderate to severe.

In accordance with some embodiments, there are provided methods of identifying a subject having atopic dermatitis that is likely to respond to nemolizumab treatment or an equivalent thereof, the method comprising, consisting of, or consisting essentially of detecting one or more excoriations of the subject's skin.

In some embodiments, the methods further comprise scoring the excoriations as mild, moderate, or severe.

In some embodiments, the methods further comprise identifying the subject as likely to respond to nemolizumab treatment or the equivalent thereof if one or more excoriations are detected that are moderate to severe.

In accordance with some embodiments, there are provided methods of treating a patient having atopic dermatitis, the method comprising, consisting of, or consisting essentially of: (a) screening the patient having atopic dermatitis for one or more skin excoriations; and (b) treating the patient screened in step (a) by administering an effective amount of nemolizumab or an equivalent thereof.

In some embodiments of the methods, the skin excoriations are moderate to severe. In some embodiments of the methods, the effective amount of nemolizumab or the equivalent thereof ranges from about 0.01 mg/kg to about 0.1 mg/kg, about 0.1 mg/kg to about 0.5 mg/kg, about 0.5 mg/kg to about 1.5 mg/kg, about 1.5 mg/kg to about 2.5 mg/kg, or about 2.5 mg/kg to about 10 mg/kg. In particular embodiments, the effective amount of nemolizumab or the equivalent thereof is about 0.1 mg/kg, about 0.5 mg/kg, about 1 mg/kg, about 1.5 mg/kg, about 2 mg/kg, or about 2.5 mg/kg. In some embodiments of the methods, the nemolizumab or the equivalent thereof is administered by a topical or parenteral route. In some embodiments of the methods, the nemolizumab or the equivalent thereof is administered subcutaneously. In some embodiments, the nemolizumab or the equivalent thereof is administered once per week, once every two weeks, once every three weeks, once every four weeks, once every five weeks, once every six weeks, once every seven weeks, or once every eight weeks.

In accordance with some embodiments, there are provided methods of improving sleep quality in a subject suffering from atopic dermatitis and having one or more skin excoriations, the method comprising administering an effective amount of nemolizumab or an equivalent thereof to the subject. In some embodiments, an improvement of sleep quality is determined by detecting an improvement in one or more of: time of sleep onset latency, total sleep time, sleep efficiency, or time of waking after sleep onset.

In some embodiments of the methods, the skin excoriations are moderate to severe. In some embodiments of the methods, the effective amount of nemolizumab or the equivalent thereof ranges from about 0.01 mg/kg to about 0.1 mg/kg, about 0.1 mg/kg to about 0.5 mg/kg, about 0.5 mg/kg to about 1.5 mg/kg, about 1.5 mg/kg to about 2.5 mg/kg, or about 2.5 mg/kg to about 10 mg/kg. In particular embodiments, the effective amount of nemolizumab or the equivalent thereof is about 0.1 mg/kg, about 0.5 mg/kg, about 1 mg/kg, about 1.5 mg/kg, about 2 mg/kg, or about 2.5 mg/kg. In some embodiments of the methods, the nemolizumab or the equivalent thereof is administered by a topical or parenteral route. In some embodiments of the methods, the nemolizumab or the equivalent thereof is administered subcutaneously. In some embodiments, the nemolizumab or the equivalent thereof is administered once per week, once every two weeks, once every three weeks, once every four weeks, once every five weeks, once every six weeks, once every seven weeks, or once every eight weeks.

BRIEF DESCRIPTION OF THE DRAWINGS

FIG. 1A depicts mild excoriations with a score of 1. FIG. 1B depicts moderate excoriations with a score of 2. FIG. 1C depicts severe excoriations with a score of 3. White arrows denote exemplary excoriation.

FIG. 2A depicts none (i.e. excoriations are absent) with a score of 0. FIG. 2B depicts mild excoriations with a score of 1. FIG. 2C depicts moderate excoriations with a score of 2. FIG. 2D depicts severe excoriations with a score of 3.

FIG. 3A depicts none (i.e. excoriations are absent) with a score of 0. FIG. 3B depicts mild excoriations with a score of 1. FIG. 3C depicts moderate excoriations with a score of 2. FIG. 3D depicts severe excoriations with a score of 3.

FIG. 6A depicts the percentage change from baseline in pruritus VAS score. Data are presented as means (SEs). FIG. 6B depicts the proportion of patients with a pruritus VAS score of less than 30 mm (post hoc analysis).

FIG. 7A depicts percentage change in EASI score (mean±SE). FIG. 7B depicts proportion of patients with an sIGA score of 0 or 1 (percentage). FIG. 7C depicts percentage change from baseline in sleep disturbance visual analog scale (VAS) (mean±SE). FIG. 7D depicts proportion of patients with a 4-point or greater decrease in DLQI (percentage; post hoc analysis).

DETAILED DESCRIPTION

Figure 1A:
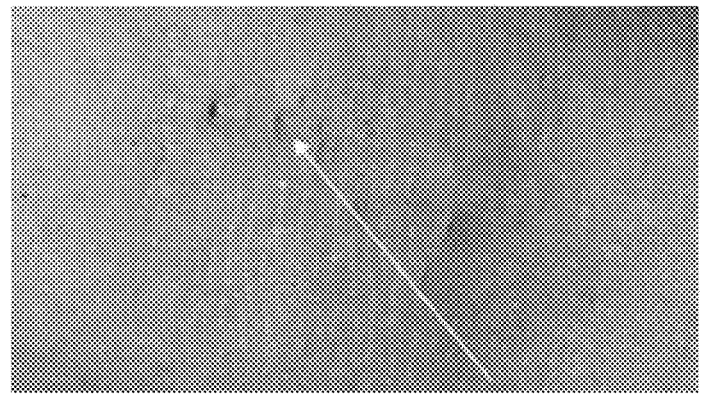
FIGS. 1A-1C. An atlas of representative images of excoriations and their corresponding Scoring Atopic Dermatitis Index (SCORAD) scores are provided. Images are from the Consensus Report of the European Task Force on Atopic Dermatitis entitled "Severity Scoring of Atopic Dermatitis: The SCORAD Index," (Stalder, J. F. et al., Dermatology (1993), 186: 23-31).
Figure 1B:
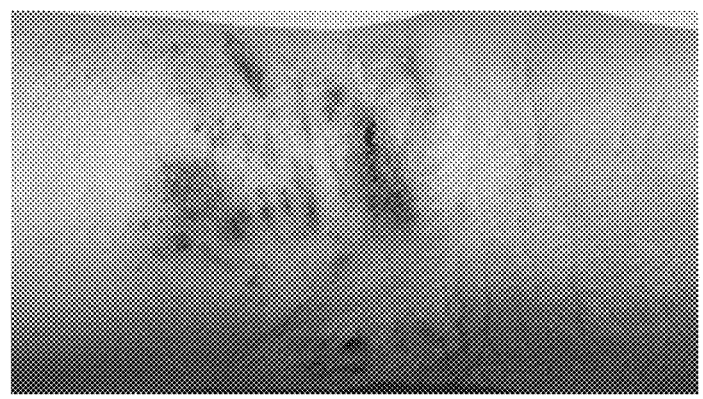
Figure 1C:
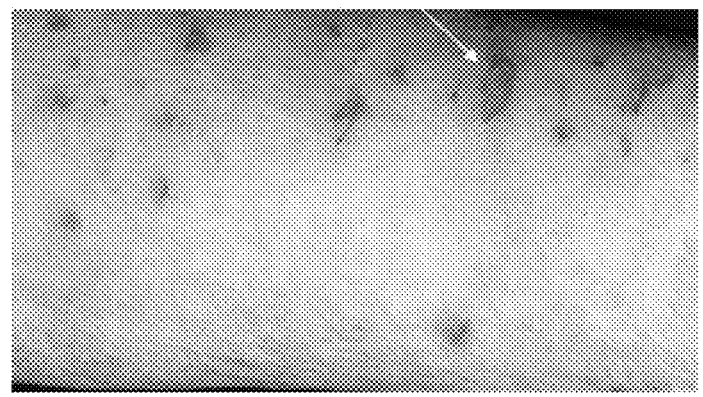
Figure 2A:
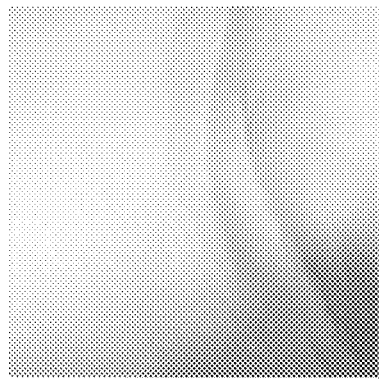
FIGS. 2A-2D. Representative drawings of excoriations on a subject's wrist. The excoriations are scored according to the SCORAD method as indicated.
Figure 2B:
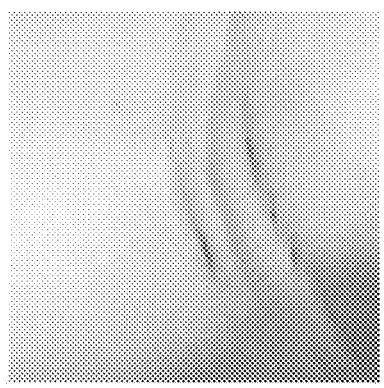
Figure 2C:
Figure 2D:
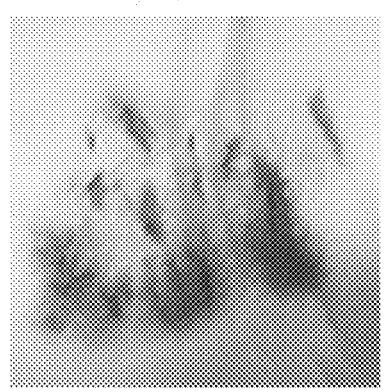
Figure 3A:
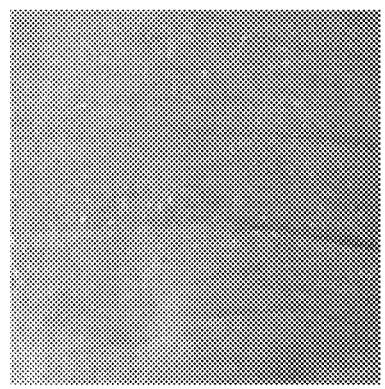
FIGS. 3A-3D. An atlas of representative images of excoriations and their corresponding Eczema Area and Severity Index (EAST) scores are provided. The excoriations are scored according to the EASI method as indicated.
Figure 3B:
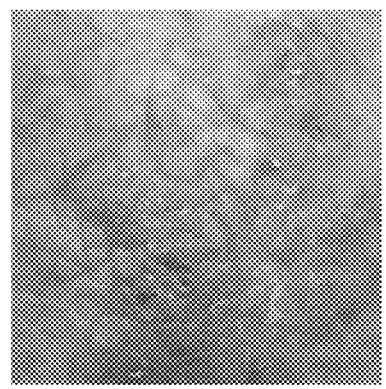
Figure 3C:
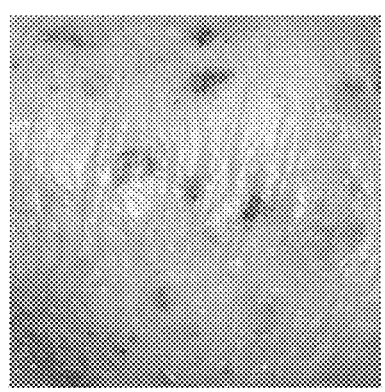
Figure 3D:
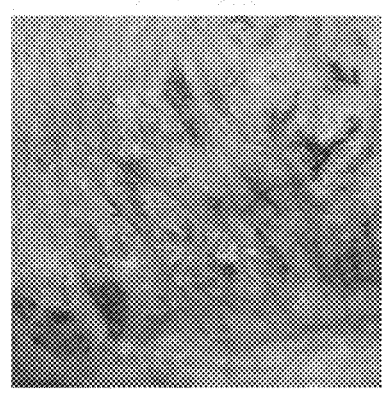

Embodiments according to the present disclosure will be described more fully hereinafter. Aspects of the disclosure may, however, be embodied in different forms and should not be construed as limited to the embodiments set forth herein. Rather, these embodiments are provided so that this disclosure will be thorough and complete, and will fully convey the scope of the invention to those skilled in the art. The terminology used in the description herein is for the purpose of describing particular embodiments only and is not intended to be limiting.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

The terminology used in the description herein is for the purpose of describing particular embodiments only and is not intended to be limiting of the invention. All publications, patent applications, patents and other references mentioned herein are incorporated by reference in their entirety.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

Definitions

As used herein, the singular forms "a," "an," and "the" designate both the singular and the plural, unless expressly stated to designate the singular only.

It is to be understood, although not always explicitly stated, that all numerical designations are preceded by the term "about." The term "about" means that the number comprehended includes but is not limited to the exact number set forth herein, and is intended to refer to the recited number as well as numbers substantially around the recited number while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 15%, 10%, 5%, 1%, or 0.1% of the particular term.

Also as used herein, "and/or" refers to and encompasses any and all possible combinations of one or more of the associated listed items, as well as the lack of combinations when interpreted in the alternative ("or").

The terms "administer," "administration," or "administering" as used herein refer to (1) providing, giving, dosing and/or prescribing, such as by either a health professional or his or her authorized agent or under his direction, and (2) putting into, taking or consuming, such as by a health professional or the subject. Administration shall include without limitation, administration by oral, parenteral (e.g., intramuscular, intraperitoneal, intravenous, ICV, intracisternal injection or infusion, subcutaneous injection, or implant), by inhalation spray nasal, vaginal, rectal, sublingual, urethral (e.g., urethral suppository) or topical routes of administration (e.g., gel, ointment, cream, aerosol, etc.) and can be formulated, alone or together, in suitable dosage unit formulations containing conventional non-toxic pharmaceutically acceptable carriers, adjuvants, excipients, and vehicles appropriate for each route of administration. The invention is not limited by the route of administration, the formulation or dosing schedule.

The terms "treat", "treating" or "treatment", as used herein, include alleviating, abating or ameliorating AD, pruritus, or one or more symptoms thereof, whether or not AD and/or pruritus is considered to be "cured" or "healed" and whether or not all symptoms are resolved. The terms also include reducing or preventing progression of AD and/or pruritus or one or more symptoms thereof, impeding or preventing an underlying mechanism of AD and/or pruritus or one or more symptoms thereof, and achieving any therapeutic and/or prophylactic benefit.

Interleukin 31 receptor subunit alpha ("IL-31RA," also known as NR10, glm-r, and GPL) is a protein that forms a heterodimer with oncostatin M receptor (OSMR) and functions as an IL-31 receptor. There are multiple known splicing variants of human-derived IL-31RA (WO 00/075314): NR10.1 consists of 662 amino acids and contains a transmembrane domain. NR10.2 is a soluble receptor-like protein consisting of 252 amino acids without the transmembrane domain. Meanwhile, known IL-31RA splicing variants that function as transmembrane receptor proteins include NR10.3 and IL-31RAv3. Preferred IL-31RA variants include NR10.3 (also referred to as ILRAv4 (Nat Immunol 5, 752-60, 2004) and IL-31RAv3. NR 10.3 (IL31RAv4) consists of 662 amino acids (WO 00/075314; Nat Immunol 5, 752-60, 2004) and IL31RAv3 consists of 732 amino acids (GenBank Accession No: NM-139017).

The amino acid sequence of IL31RAv4 is:

```
                                            (SEQ ID NO: 1)
MKLSPQPSCVNLGMMWTWALWMLPSLCKFSLAALPAKPENISCVYYYRKN

LTCTWSPGKETSYTQYTVKRTYAFGEKHDNCTTNSSTSENRASCSFFLPR

ITIPDNYTIEVEAENGDGVIKSHMTYWRLENIAKTEPPKIFRVKPVLGIK

RMIQIEWIKPELAPVSSDLKYTLRFRTVNSTSWMEVNFAKNRKDKNQTYN

LTGLQPFTEYVIALRCAVKESKFWSDWSQEKMGMTEEEAPCGLELWRVLK

PAEADGRRPVRLLWKKARGAPVLEKTLGYNIWYYPESNTNLTETMNTTNQ

QLELHLGGESFWVSMISYNSLGKSPVATLRIPAIQEKSFQCIEVMQACVA

EDQLVVKWQSSALDVNTWMIEWFPDVDSEPTTLSWESVSQATNWTIQQDK

LKPFWCYNISVYPMLHDKVGEPYSIQAYAKEGVPSEGPETKVENIGVKTV

TITWKEIPKSERKGIICNYTIFYQAEGGKGFSKTVNSSILQYGLESLKRK

TSYIVQVMASTSAGGTNGTSINFKTLSFSVFEIILITSLIGGGLLILIIL

TVAYGLKKPNKLTHLCWPTVPNPAESSIATWHGDDFKDKLNLKESDDSVN

TEDRILKPCSTPSDKLVIDKLVVNFGNVLQEIFTDEARTGQENNLGGEKN

GTRILSSCPTSI
```

The amino acid sequence of IL31RAv3 is:

```
                                            (SEQ ID NO: 2)
MMWTWALWMLPSLCKFSLAALPAKPENISCVYYYRKNLTCTWSPGKETSY

TQYTVKRTYAFGEKHDNCTTNSSTSENRASCSFFLPRITIPDNYTIEVEA

ENGDGVIKSHMTYWRLENIAKTEPPKIFRVKPVLGIKRMIQIEWIKPELA

PVSSDLKYTLRFRTVNSTSWMEVNFAKNRKDKNQTYNLTGLQPFTEYVIA

LRCAVKESKFWSDWSQEKMGMTEEEAPCGLELWRVLKPAEADGRRPVRLL

WKKARGAPVLEKTLGYNIWYYPESNTNLTETMNTTNQQLELHLGGESFWV

SMISYNSLGKSPVATLRIPAIQEKSFQCIEVMQACVAEDQLVVKWQSSAL

DVNTWMIEWFPDVDSEPTTLSWESVSQATNWTIQQDKLKPFWCYNISVYP

MLHDKVGEPYSIQAYAKEGVPSEGPETKVENIGVKTVTITWKEIPKSERK
```

-continued
GIICNYTIFYQAEGGKGFSKTVNSSILQYGLESLKRKTSYIVQVMASTSA

GGINGTSINFKTLSFSVFEIILITSLIGGGLLILIILTVAYGLKKPNKLT

HLCWPTVPNPAESSIATWHGDDFKDKLNLKESDDSVNTEDRILKPCSTPS

DKLVIDKLVVNFGNVLQEIFTDEARTGQENNLGGEKNGYVTCPFRPDCPL

GKSFEELPVSPEIPPRKSQYLRSRMPEGTRPEAKEQLLFSGQSLVPDHLC

EEGAPNPYLKNSVTAREFLVSEKLPEHTKGEV

Mouse-derived IL-31RA includes proteins comprising the amino acid sequence:

(SEQ ID NO: 3)
MWTLALWAFSFLCKFSLAVLPTKPENISCVFYFDRNLTCTWRPEKETNDT

SYIVTLTYSYGKSNYSDNATEASYSFPRSCAMPPDICSVEVQAQNGDGKV

KSDITYWHLISIAKTEPPIILSVNPICNRMFQIQWKPREKTRGFPLVCML

RFRTVNSSRWTEVNFENCKQVCNLTGLQAFTEYVLALRFRFNDSRYWSKW

SKEETRVTMEEVPHVLDLWRILEPADMNGDRKVRLLWKKARGAPVLEKTF

GYHIQYFAENSTNLTEINNITTQQYELLLMSQAHSVSVTSFNSLGKSQEA

ILRIPDVHEKTFQYIKSMKAYIAEPLLVVNWQSSIPAVDTWIVEWLPEAA

MSKFPALSWESVSQVTNWTIEQDKLKPFTCYNISVYPVLGHRVGEPYSIQ

AYAKEGTPLKGPETRVENIGLRTATITWKEIPKSARNGFINNYTVFYQAE

GGKELSKTVNSHALQCDLESLTRRTSYTVWVMASTRAGGINGVRINFKIL

SISVFEIVLLTSLVGGGLLLLSIKTVTFGLRKPNRLTPLCCPDVPNPAES

SLATWLGDGFKKSNMKETGNSGDTEDVVLKPCPVPADLIDKLVVNFENFL

EVVLTEEAGKGQASILGGEANEYVTSPSRPDGPPGKSFKEPSVLTEVASE

DSHSTCSRMADEAYSELARQPSSSCQSPGLSPPREDQAQNPYLKNSVTTR

EFLVHENIPEHSKGEV

Cynomolgus monkey-derived IL-31RA includes proteins comprising the amino acid sequence:

(SEQ ID NO: 4)
MMWTWALWMFPLLCKFGLAALPAKPENISCVYYYRKNLTCTWSPGKETSY

TQYTAKRTYAFGKKHDNCTTSSSTSENRASCSFFLPRITIPDNYTIEVEA

ENGDGVIKSDMTCWRLEDIAKTEPPEIFSVKPVLGIKRMIRIEWIKPELA

PVSSDLKYALRFRTVNSTSWMEVNFAKNRKDTNQTYNLMGLQAFTEYVVA

LRCAVKESKFWSDWSQEKMGMTEEEAPCGLELWRVLKPTEVDGRRPVRLL

WKKARGAPVLEKTLGYNIWYFPENNTNLTETVNTTNQQLELHLGGESYWV

SMISYNSLGKSPVTTLRIPAIQEKSFRCIEVMQACLAEDQLVVKWQSSAL

DVNTWMIEWFPDMDSEHPTLSWESVSQATNWTIQQDKLKPFWCYNISVYP

MLHDKVGEPYSIQAYAKEGIPSKGPETKVENIGVKTVTITWKEIPKSERK

GIICNYTIFYQAEGGKGFSKTVNSSILQYGLESLKRKTSYTVRVMASTSA

GGINGTSINFKTLSFSVFEIILITSLIGGGLLILIILTVAYGLKKPNKLT

HLCWPSVPNPAESSIATWRGDDFKDKLNLKESDDSVNTEDRILKPCSTPS

DKLVIDKSVVNFGNVLQEMFTDEARTGQENNLGGEKNEYVTHPFRADCPL

GKSFEELPVSPEIPPRKSQYLRSRMPEGTCLEAEEQLLVSGQSLESLAPD

HVREAAAPNPYLKNSVTTREFLVSQKLPEHTKGEV

As used herein, the term "subject" is used interchangeably with "patient," and indicates a mammal, in particular a human, equine, bovine, porcine, feline, canine, murine, rat, or non-human primate. In preferred embodiments, the subject is a human. The subject may or may not be in need of an assessment of skin scratching and/or skin excoriations. In some embodiments, the subject is assessed for skin scratching and/or skin excoriations prior to the administration of nemolizumab treatment. In some embodiments, the subject is a child, less than 13 years old, less than 8 years old, less than 5 years old, less than 3 years old, less than 2 years old, or less than 1-year-old. In other embodiments, the subject is an adult.

The term "atopic dermatitis" (i.e., "AD") is used herein as it is in the art and means chronic inflammation of the skin. The cause of AD is unknown but may involve genetics, immune system dysfunction, environmental exposures, and/or difficulties with the permeability of the skin. Symptoms of AD include but are not limited to pruritus, dry skin, itching, which may be severe especially at night, red to brownish-gray patches of skin especially on the hands, feet, ankles, wrists, neck, upper chest, eyelids, inside the bend of the elbows and knees, and in infants, the face and scalp, small, raised bumps which may leak fluid and crust over when scratched, thickened skin, cracked skin, scaly skin, raw skin, skin sensitivity, swollen skin, and interruption and/or loss of sleep. AD most often begins before age 5 and may persist into adolescence and adulthood. In some patients, AD flares up periodically followed by periods of clearance that may last several years.

The term "pruritus" is used herein as it is in the art and refers to itchy skin and/or an itch sensation. Pruritus may be caused by AD or other diseases or conditions such as dry skin. In some cases, pruritus involves generalized itchy skin over the whole body. In some cases, pruritus is localized to specific regions of the body such as on an arm or leg. Pruritus can be chronic or acute. Symptoms of pruritus include but are not limited to skin excoriations, redness, bumps, spots, blisters, dry skin, cracked skin, and leathery or scaly texture to the skin. In some cases, pruritus does not result in detectable changes to the skin. Behavioral responses to pruritus include but are not limited to skin scratching and/or skin massage. In some cases, skin scratching can result in excoriations that range from mild to severe. In some cases, patients with pruritus abstain from scratching and/or massaging the skin. Traditional treatments for pruritus include but are not limited to skin moisturizers, topical emollients, antihistamines such as diphenhydramine, corticosteroids such as hydrocortisone topical cream, counterirritants such as mint oil, menthol, or camphor, crotamiton, an antipruritic agent often used to treat scabies, local anesthetics such as benzocaine topical cream, and phototherapy. The common type of light used is for phototherapy is UVB.

As used herein, the term "antibody" collectively refers to immunoglobulins or immunoglobulin-like molecules including by way of example and without limitation, IgA, IgD, IgE, IgG and IgM, combinations thereof or fragments thereof. Fragments of antibodies including, by way of example and without limitation, Fab fragments and single chain variable fragments (scFv), and similar molecules produced during an immune response in any vertebrate, for example, in mammals such as humans, goats, rabbits and mice, as well as non-mammalian species, such as shark immunoglobulins.

In terms of antibody structure, an immunoglobulin generally has heavy (H) chains and light (L) chains interconnected by disulfide bonds. There are two types of light chain, lambda (λ) and kappa (κ). There are five main heavy chain classes (or isotypes) which determine the functional activity of an antibody molecule: IgM, IgD, IgG, IgA and IgE. Each heavy and light chain contains a constant region and a variable region, (the regions are also known as "domains"). In combination, the heavy and the light chain variable regions, also called the "Fab region," specifically bind the antigen. Light and heavy chain variable regions contain a "framework" region interrupted by three hypervariable regions, also called "complementarity-determining regions" or "CDRs". The extent of the framework region and CDRs has been defined (see, Kabat et al., Sequences of Proteins of Immunological Interest, U.S. Department of Health and Human Services, 1991, which is hereby incorporated by reference). The Kabat database is now maintained online. The sequences of the framework regions of different light or heavy chains are relatively conserved within a species. The framework region of an antibody, that is the combined framework regions of the constituent light and heavy chains, largely adopts a β-sheet conformation and the CDRs form loops which connect, and in some cases form part of, the β-sheet structure. Thus, framework regions act to form a scaffold that provides for positioning the CDRs in correct orientation by inter-chain, non-covalent interactions.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds IL-31RA will have a specific $V_H$ region and the $V_L$ region sequence, and thus specific CDR sequences. Antibodies with different specificities (i.e. different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs). The base of the antibody plays a role in modulating immune cell activity. This region is called the Fc fragment region (Fc) and is composed of two heavy chains that contribute two or three constant domains depending on the class of the antibody. The Fc region functions to guarantee that each antibody generates an appropriate immune response for a given antigen, by binding to a specific class of proteins found on certain cells, such as B lymphocytes, follicular dendritic cells, natural killer cells, macrophages, neutrophils, etc. and are call "Fc receptors." Because the constant domains of the heavy chains make up the Fc region of an antibody, the classes of heavy chain in antibodies determine their class effects. The heavy chains in antibodies include alpha, gamma, delta, epsilon, and mu, and correlate to the antibody's isotypes IgA, G, D, E, and M, respectively. This infers different isotypes of antibodies have different class effects due to their different Fc regions binding and activating different types of receptors.

There are four subclasses of IgG, which is the most abundant antibody isotype found in human serum. The four subclasses, IgG1, IgG2, IgG3, and IgG4, which are highly conserved. See generally, world wide web: ncbi.nlm.nih-.gov/pmc/articles/PMC4202688/. The amino acid sequence of the constant regions of these peptides are known in the art, e.g., see Rutishauser, U. et al. (1968) "Amino acid sequence of the Fc region of a human gamma G-immunoglobulin" PNAS 61(4):1414-1421; Shinoda et al. (1981) "Complete amino acid sequence of the Fc region of a human delta chain" PNAS 78(2):785-789; and Robinson et al. (1980) "Complete amino acid sequence of a mouse immunoglobulin alpha chain (MOPC 511)" PNAS 77(8):4909-4913.

Therapeutic Antibodies

"Nemolizumab" is a humanized monoclonal antibody that binds to IL-31RA. Nemolizumab is annotated as follows: immunoglobulin G2-kappa, anti-[*Homo sapiens* IL31RA (interleukin 31 receptor subunit alpha)], humanized monoclonal antibody; gamma2 heavy chain (1-445) [humanized VH (*Homo sapiens* IGHV1-2*02 (83.70%)-(IGHD)-IGHJ5*01) [8.8.14] (1-121)-*Homo sapiens* IGHG2*01 (CH1 C10>S (135), R12>K (137), E16>G (141), S17>G (142) (122-219), hinge C4>S (223) (220-231), CH2 H30>Q (268) (232-340), CH3 R11>Q (355), Q98>E (419) (341-445)) (122-445)], (224-214')-disulfide with kappa light chain (1'-214') [humanized V-KAPPA (*Homo sapiens* IGKV1-39*01 (82.10%)—IGKJ4*01) [6.3.9] (1'-107')-*Homo sapiens* IGKC*01 (108'-214')]; dimer (227-227":230-230")-bisdisulfide. Nemolizumab has disulfide bridges at the following locations: Intra-H (C23-C104) 22-96 148-204 261-321 367-425 22"-96" 148"-204" 261"-321" 367"-425"; Intra-L (C23-C104) 23'-88' 134'-194' 23'''-88''' 134'''-194'''; Inter-H-L (h 5-CL 126) 224-214' 224"-214'''; Inter-H—H (h 8, h 11) 227-227" 230-230". Nemolizumab has N-glycosylation sites at the following locations: H CH2 N84.4: 297, 297". Nemolizumab lacks H Chain C-terminal glycine and lysine (CHS G1>del, K2>del).

Nemolizumab heavy chain amino acid sequence:

(SEQ ID NO: 5)
```
QVQLVQSGAE VKKPGASVKV SCKASGYTFT GYIMNWVRQA

PGQGLEWMGL INPYNGGTDY NPQFQDRVTI TADKSTSTAY

MELSSLRSED TAVYYCARDG YDDGPYTLET WGQGTLVTVS

SASTKGPSVF PLAPSSKSTS GGTAALGCLV KDYFPEPVTV

SWNSGALTSG VHTFPAVLQS SGLYSLSSVV TVPSSNFGTQ

TYTCNVDHKP SNTKVDKTVE RKSCVECPPC PAPPVAGPSV

FLFPPKPKDT LMISRTPEVT CVVVDVSQED PEVQFNWYVD

GVEVHNAKTK PREEQFNSTF RVVSVLTVVH QDWLNGKEYK

CKVSNKGLPA PIEKTISKTK GQPREPQVYT LPPSQEEMTK

NQVSLTCLVK GFYPSDIAVE WESNGQPENN YKTTPPMLDS

DGSFFLYSKL TVDKSRWQEG NVFSCSVMHE ALHNHYTQKS

LSLSP
```

Nemolizumab light chain amino acid sequence:

(SEQ ID NO: 6)
```
DIQMTQSPSS LSASVGDRVT ITCQASEDIY SFVAWYQQKP

GKAPKLLIYN AQTEAQGVPS RFSGSGSGTD FTLTISSLQP
```

```
EDFATYYCQH HYDSPLTFGG GTKVEIKRTV AAPSVFIFPP

SDEQLKSGTA SVVCLLNNFY PREAKVQWKV DNALQSGNSQ

ESVTEQDSKD STYSLSSTLT LSKADYEKHK VYACEVTHQG

LSSPVTKSFN RGEC
```

The variable domains of the heavy and light chain sequences are shown in bold above, and the CDR sequences are underlined.

Equivalent antibodies to nemolizumab include but are not limited to: (i) antibodies with heavy chains comprising at least 55%, at least 65%, at least 70%, at least 75%, at least 80%, at least 85%, at least 90%, at least 95%, at least 97%, at least 98%, at least 99%, or 100% amino acid sequence identity to nemolizumab's heavy chain sequence, (ii) antibodies with light chains comprising at least 55%, at least 65%, at least 70%, at least 75%, at least 80%, at least 85%, at least 90%, at least 95%, at least 97%, at least 98%, at least 99%, or 100% amino acid sequence identity to nemolizumab's light chain sequence, (iii) antibodies with variable regions comprising at least 55%, at least 65%, at least 70%, at least 75%, at least 80%, at least 85%, at least 90%, at least 95%, at least 97%, at least 98%, at least 99%, or 100% amino acid sequence identity to nemolizumab's variable region sequences, (iv) antibodies with CDRs comprising at least 55%, at least 65%, at least 70%, at least 75%, at least 80%, at least 85%, at least 90%, at least 95%, at least 97%, at least 98%, at least 99%, or 100% amino acid sequence identity to nemolizumab's CDR sequences, (v) antibodies that bind to the same isoform of IL-31RA as nemolizumab (e.g., IL31-RAv3), optionally the same epitope of IL-31RA, (vi) antibodies that block or neutralize IL-31RA, (vii) antibodies that bind to oncostatin M receptor (OSMR), and (viii) combinations thereof. For example, suitable equivalents include immunoglobulins or immunoglobulin-like molecules with the same or substantially similar heavy and light chain amino acid sequences as nemolizumab. Additional exemplary nemolizumab equivalents are described, for example, in WO 2010/064697.

Equivalents of nemolizumab may be monoclonal or polyclonal antibodies. Such monoclonal antibodies having IL31-RA-binding and/or neutralizing activity can be obtained, for example, by the following procedure: anti-IL31-RA monoclonal antibodies are prepared by using as an antigen IL31-RA or a fragment thereof that is derived from a mammal such as human or mouse by known methods, and then antibodies having IL31-RA-binding and/or neutralizing activity are selected from the thus obtained anti-IL31-RA monoclonal antibodies. Specifically, a desired antigen or cells expressing the desired antigen are used as a sensitizing antigen for immunization according to conventional immunization methods. Anti-IL31-RA monoclonal antibodies can be prepared by fusing the obtained immune cells with known parental cells using conventional cell fusion methods, and screening them for monoclonal antibody-producing cells (hybridomas) by conventional screening methods. Animals to be immunized include, for example, mammals such as mice, rats, rabbits, sheep, monkeys, goats, donkeys, cows, horses, and pigs. The antigen can be prepared using the known IL31-RA gene sequence according to known methods, for example, by methods using baculovirus (for example, WO 98/46777).

Hybridomas can be prepared, for example, according to the method of Milstein et al. (Kohler, G. and Milstein, C., Methods Enzymol. (1981) 73: 3-46). When the immunogenicity of an antigen is low, immunization may be performed after linking the antigen with a macromolecule having immunogenicity, such as albumin. Antigens used to prepare monoclonal antibodies that have a binding and/or neutralizing activity against human IL31-RA are not particularly limited, as long as they enable preparation of antibodies that have a binding and/or neutralizing activity against human IL31-RA. For example, it is known that there are a number of variants of human IL31-RA, and any variant may be used as an immunogen as long as it enables preparation of antibodies that have a binding and/or neutralizing activity against human IL31-RA. Alternatively, under the same condition, a peptide fragment of IL31-RA or a protein in which artificial mutations have been introduced into the natural IL31-RA sequence may be used as an immunogen. Human IL31-RA.3 is one of preferred immunogens in preparing antibodies that have an activity of binding and/or neutralizing IL31-RA in the present disclosure.

The IL31-RA-binding activity of the equivalent antibodies can be determined by methods known to those skilled in the art. Methods for determining the antigen-binding activity of an antibody include, for example, ELISA (enzyme-linked immunosorbent assay), EIA (enzyme immunoassay), RIA (radioimmunoassay), and fluorescent antibody method. For example, when enzyme immunoassay is used, antibody-containing samples, such as purified antibodies and culture supernatants of antibody-producing cells, are added to antigen-coated plates. A secondary antibody labeled with an enzyme, such as alkaline phosphatase, is added and the plates are incubated. After washing, an enzyme substrate, such as p-nitrophenyl phosphate, is added, and the absorbance is measured to evaluate the antigen-binding activity. The binding and/or neutralizing activity of an equivalent antibody against IL31-RA can be measured, for example, by observing the effect of suppressing the growth of the IL-31-dependent cell line. For example, the activity of a purified mouse IL-31 antibody can be assayed by assessing the IL-31-dependent growth of Ba/F3 cells transfected with mouse IL-31 receptor α and mouse OSMR genes.

Excoriations as a Biomarker for Response to Nemolizumab Treatment

The inventors have hypothesized that an anti-pruritic drug could have a greater impact on AD in patients that suffer from skin scratching due to pruritus than on patient that do not scratch. Without being bound by theory, it is believed that the itch-scratch cycle is not only a symptom of AD, but an aggravating factor of AD in a subset of AD patients that scratch their skin in response to pruritis. In the itch-scratch cycle, the strong actions of scratching facilitate susceptibility to increased itching and the exacerbation of skin lesions, called excoriations.

An objective way to identify subjects that suffer from skin scratching due to pruritus is to identify subjects with excoriations caused by scratching. Excoriations refer to an injury to the skin caused by trauma such as scratching or abrasion. In some embodiments of the methods described herein, excoriations can be identified by the presence, number, and/or intensity of lesions with one or more of the following characteristics: linearity, fissure or break in the skin surface, scabbing, serous crust, blood, redness, skin abrasion, or tearing of the skin. Fissured excoriations are excoriations with a linear split through the epidermis into the underlying dermis.

In some embodiments, excoriations are scored as none, mild, moderate, or severe. "None," "mild," "moderate," and "severe" are terms of art in describing the presence, extent, and/or intensity of excoriations. Those of skill in the art know the metes and bounds of these terms. For example, methods of assessing atopic dermatitis used by health care professionals and comprising scoring excoriations as none, mild, moderate, and severe include but are not limited to: Atopic Dermatitis Assessment Measure (ADAM), Eczema Area and Severity Index (EAST), self-administered EASI (SA-EASI), SCORing Atopic Dermatitis (SCORAD), Six Area Six Sign Atopic Dermatitis Index (SASSAD), Simple Scoring System (SSS), and Three Item Severity Score (TIS). In some embodiments, a score of none is denoted with the number zero, a mild score is denoted with the number one, a moderate score is denoted with the number two, and a severe score is denoted with the number three.

As used herein, the term "none to mild" refers to skin excoriation(s) scored as none, mild, or there between. In some embodiments, "none to mild" refers to skin excoriation(s) scored as 0, 1, 1.5, 0 to 1, ≤1, or <2. In some embodiments, "none to mild" refers to a range of skin excoriation scores from about 0 to about 1. As used herein, the term "moderate to severe" refers to skin excoriation(s) scored as moderate, severe, or there between. In some embodiments, "moderate to severe" refers to skin excoriations scored as 2, 2.5, 3, 2 to 3, or ≥2. In some embodiments, "moderate to severe" refers to a range of skin excoriation scores from about 2 to about 3.

In some embodiments, excoriations are scored according to one or more of the following methods: SCORAD (disclosed in Stalder, J. F. et al., Dermatol (1993), 186: 23-31, the entire disclosure of which is incorporated herein by reference), Patient-Oriented SCORAD (disclosed in Vourc'h-Jourdain, M. et al., Dermatology (2009) 218: 246-51, the entire disclosure of which is incorporated herein by reference), ADAM (disclosed in Charman, D. et al., J. Outcome Meas. (1999) 3: 21-34, the entire disclosure of which is incorporated herein by reference), EASI (disclosed in Tofte, S. J. et al., J Eur Acad Dermatol Venereol (1998) 11: S197, the entire disclosure of which is incorporated herein by reference), SA-EASI (disclosed in Housman T. S. et al., Br J Dermatol (2002) 147:1192-8, the entire disclosure of which is incorporated herein by reference), SASSAD (disclosed in Berth-Jones, J., Br J Dermatol (1996) 135: 25-30, the entire disclosure of which is incorporated herein by reference), SSS (disclosed in Costa, C. et al., Acta Derm Venereol (1989) 69: 42-5, the entire disclosure of which is incorporated herein by reference), and TIS (disclosed in Wolkerstorfer, A. et al., Acta Derm. Venereol. (1999) 79: 356-59, the entire disclosure of which is incorporated herein by reference). In preferred embodiments, excoriations are scored according to a SCORAD and/or PO-SCORAD method.

The SCORAD methods (SCORAD and PO-SCORAD) are methods of determining the severity of AD comprising scoring excoriations as none (score=0), mild (score=1), moderate (score=2), or severe (score=3) on the basis of the presence and intensity of excoriations at a representative excoriation site. A representative excoriation site is a site comprising excoriation(s) of average intensity for the subject. Excoriation scoring performed according to a SCORAD method does not comprise fraction-based scoring (e.g., half-point scoring such as 0.5, 1.5, or 2.5). Exemplary images of excoriations scored according to the SCORAD excoriation method are provided in FIG. 1A-1C, FIG. 2A-2D, Stalder et al. (1993), and Oranje, A. P. et al. (Pediatr. Allergy Immunol. (1997) 8: 28-34, the entire disclosure of which is incorporated herein by reference).

The EASI methods (EASI and SA-EASI) are methods of determining the severity of eczema comprising scoring excoriations as none (score=0), mild (score=1), moderate (score=2), or severe (score=3) on the basis of the average excoriation intensity in each of four body regions: head and neck, trunk, upper limbs, and lower limbs. Body regions with excoriations that are absent are scored as none (score=0), excoriations that are just perceptible, scant, and/or superficial are scored as mild (score=1), excoriations comprising many superficial and/or some deep excoriations are scored as moderate (score=2), and diffuse, extensive superficial excoriations and/or many deep excoriations are scored as severe (score=3). Half scores (e.g. 2.5) are permissible in the EASI method. However, a score of 0.5 is not permitted because the minimum score for present excoriations under the EASI method is mild (score=1). An atlas of representative images of excoriations scored by the EASI method is provided in FIG. 3A-3D.

The ADAM method is a method of determining the severity of AD comprising scoring excoriations on the basis of the total number of excoriations present on the subject's skin. Fewer than 5 excoriations is scored as a 0, 5 to 20 excoriations is scored as a 1, greater than 20 excoriations is scored as a 2, and fissured excoriations are scored as a 3.

The SASSAD method is a method of determining the severity of AD comprising scoring excoriations as absent (score=0), mild (score=1), moderate (score=2), or severe (score=3) on the basis of prominence of excoriations at the worst affected excoriation site within each of six areas of the subject: hands, arms, feet, legs, head/neck, and trunk. The SASSAD method defines excoriations as any damage to the skin caused by scratching, but not caused by erythema or urtication. Under the SASSAD method, absent excoriations cannot be detected with certainty even after careful inspection, mild excoriations are present excoriations that require careful inspection in order to be observed, moderate excoriations are present excoriations that are immediately apparent, and severe excoriations are present excoriations that are very prominent.

The SSS method is a method of determining the severity of AD comprising scoring excoriations and cracking as none (score=0), mild (score=1), moderate (score=2), or severe (score=3) on the basis of severity at each of 20 sites of the subject: scalp, ears, peribuccal, periocular, face, neck, chest, tummy, back, elbows, arms, axillae, hands and dorsal wrists, balms and wrists, buttocks and groin, popliteal space, thighs, legs, arches, and soles.

Like SCORAD, the TIS method is a method of determining the severity of AD comprising scoring excoriations on a scale from none (score=0), mild (score=1), moderate (score=2), or severe (score=3) on the basis of the presence and intensity of excoriations at the most representative excoriation site. A representative excoriation site is a site comprising excoriation(s) of average intensity for the subject. Excoriation scoring performed according to a TIS method does not comprise fraction-based scoring (e.g., half-point scoring such as 0.5, 1.5, or 2.5).

To test the hypothesis that AD patients that suffer from skin scratching due to pruritis are a sub-population of responders to nemolizumab treatment, published data from a study of adults with moderate-to-severe AD treated with subcutaneous nemolizumab (Ruzicka, T. et al. N. Engl. J. Med. (2017), 376: 826-35, the entire disclosure of which is incorporated herein by reference) were analyzed to determine the effect of treatment in patients with evidence of scratching. AD patients from the Ruzicka et al. nemolizumab study were separated into two groups on the basis of skin excoriations: (i) AD patients with none to mild excoriations at baseline; and (ii) AD patients with moderate to severe excoriations at baseline. Excoriations were scored according to the SCORAD method. The study parameters were then re-analyzed, comparing the relative treatment effect in each population as compared to placebo.

The Ruzicka et al. nemolizumab study was a phase 2, randomized, double-blind, placebo-controlled trial lasting 12 weeks and comprising 264 patients (Clinical Trial No. NCT01986933). Eligible patients were adults with moderate to severe atopic dermatitis that is not adequately controlled by topical treatments. Patients were not eligible for the study if they had active dermatologic diseases concomitant with AD. Enrolled patients received subcutaneous nemolizumab or placebo at a dose of 0.1 mg/kg, 0.5 mg/kg, or 2.0 mg/kg every 4 weeks. Some patients alternatively received a dose of 2.0 mg/kg every 8 weeks. The primary end point of the study was an improvement in the pruritus visual-analog scale (VAS) score. Additional end points included improvements in body-surface area of atopic dermatitis and the Eczema Area and Severity Index (EAST). At the conclusion of the study, the largest percentage change in the EASI score at 12 weeks, −42.3%, occurred in the group receiving 0.5 mg/kg nemolizumab every 4 weeks. This dose also presented the best benefit-risk profile. However, improvements in EASI scores were also observed in the other dosage groups (−23.0% in the 0.1 mg group and −40.9% in the 2.0 mg group). Improvements were also observed in VAS score for each dose.

The results of inventors' analysis of the Ruzicka et al. nemolizumab study are presented in Table 1 and Table 2 below. Pruritus VAS scores range from 0 (no itch) to 100 (worst imaginable itch) and were recorded daily by patients using an electronic reporting tool. Negative changes in VAS score indicate improvement. EASI scores range from 0 to 72, with higher scores indicating worse disease severity. Investigators' Global Assessment (IGA) scores range from 0 (clear) to 5 (very severe disease) and are presented as a percentage of patients in the indicated population. Sleep refers to sleep measurements which were recorded by means of actigraphy, which documents whole-body movement and is a validated motion-detection method for recording sleep measurements including sleep efficiency. Sleep efficiency is the total sleeping time divided by the total time in bed. Dermatology Life Quality Index (DLQI) scores range from 0 to 30, with higher scores indicating a lower quality of life. To be eligible for the Ruzicka et al. study, patients were required to have a baseline EASI score of at least 10, a baseline pruritus VAS score of at least 50 mm, and a baseline IGA score of at least 3.

As shown in Table 1, the two groups of AD patients in the study presented comparable level of pruritus, DLQI, and sleep efficiency. While the EASI and IGA were not balanced between the two groups, this is expected because these two parameters are influenced by the presence or absence of excoriations.

TABLE 1

Baseline Clinical Characteristics

| BASELINE | | Excoriation None to Mild (n = 44) | Excoriation Moderate to Severe (n = 220) |
|---|---|---|---|
| Pruritus VAS | Mean mm | 78.9 | 78.8 |
| | Very Severe (%) | 29.5 | 27.3 |

TABLE 1-continued

Baseline Clinical Characteristics

| BASELINE | | Excoriation None to Mild (n = 44) | Excoriation Moderate to Severe (n = 220) |
|---|---|---|---|
| DLQI | Mean | 13.3 | 15.1 |
| Sleep efficiency | Mean (%) | 67.3 | 66.7 |
| EASI | Mean | 20.2 | 31.3 |
| | Moderate (%) | 68.2 | 26.8 |
| | Severe (%) | 31.8 | 61.8 |
| | Very Severe (%) | 0 | 11.4 |
| IGA | Moderate (%) | 65.9 | 42.3 |
| | Severe (%) | 34.1 | 44.1 |
| | Very Severe (%) | 0 | 13.6 |

As shown in Table 2, the presence of excoriations influenced the efficacy of nemolizumab treatment in AD patients. Treatment outcome at 12 weeks was improved for all parameters in the population of patients with moderate to severe excoriations. These results were generated by comparing the net effect (nemolizumab effect-placebo effect) between the two groups. For example, upon treatment with nemolizumab, patients with none to mild excoriations exhibited a 13% improvement in sleep efficiency. In contrast, patients with moderate to severe excoriations exhibited a 39% improvement in sleep efficiency, a three-fold better response than the none to mild excoriation population.

TABLE 2

Treatment Outcome

| WEEK 12 | | Excoriation None to Mild | | | | Excoriation Moderate to Severe | |
|---|---|---|---|---|---|---|---|
| | | Placebo (n = 8) | Nemolizumab 0.5 mg/kg (n = 9) | Net effect | Net effect | Placebo (n = 35) | Nemolizumab 0.5 mg/kg (n = 36) |
| Pruritus VAS | Mean Change | −25 | −50.8 | −25.8 | −35.7 | −20.4 | −56.1 |
| | Mean Reduction | 32 | 62.6 | 30.6 | 42.1 | 26.5 | 68.6 |
| DLQI | Mean Change | −3.9 | −5.8 | −1.9 | −2.6 | −3.9 | −6.5 |
| Sleep | Mean Change | −27.3 | −40.8 | −13.5 | −39.9 | −15.2 | −55.1 |
| EASI | Mean Change | −9.6 | −10 | −0.4 | −2.1 | −10.4 | −12.5 |
| | Mean Reduction | 51.3 | 57 | 5.7 | 14.9 | 31.8 | 46.7 |
| IGA | % success | 12.5 | 22.2 | 9.7 | 16.6 | 2.9 | 19.5 |

The data presented in Table 2 demonstrates that the presence of moderate to severe excoriations is a biomarker for predicting the efficacy of nemolizumab treatment in AD patients.

Accordingly, provided herein are methods of identifying a subject having atopic dermatitis that is likely to respond to nemolizumab treatment or treatment with an equivalent thereof, the method comprising, consisting of, or consisting essentially of detecting one or more excoriations of the subject's skin. In some embodiments, provided herein are methods of determining whether a subject having atopic dermatitis is likely to respond to nemolizumab treatment or treatment with an equivalent thereof comprising, consisting of, or consisting essentially of detecting one or more excoriations of the subject's skin. In some embodiments, provided herein are methods of predicting whether a subject having atopic dermatitis is likely to respond to nemolizumab treatment or treatment with an equivalent thereof comprising, consisting of, or consisting essentially of detecting one or more excoriations of the subject's skin. In some embodiments, the skin excoriations were caused by pruritus.

In some embodiments, the methods comprise detecting 1, 2, 3, 4, 5, 6, 7, 8, 9, 10, 11, 12, 13, 14, 15, 16, 17, 18, 19, 20, 30, 40, or 50 or more skin excoriations. In some embodiments, the extent of skin excoriations is detected by detecting the total skin surface area affected, the number and/or size of regions affected, or the percent of body surface area affected. In some embodiments, excoriations are detected at a specific region or site of the subject's skin that comprises excoriations that are representative of the subject's average intensity of excoriations. In some embodiments, excoriations are detected at a specific region or site of the subject's skin that comprises excoriations that are representative of the worst (i.e. most severe) intensity of excoriations. In some embodiments, the average intensity or worst intensity of excoriations is detected at one or more of the following sites of the subject: hands, arms, feet, legs, head, neck, head and neck, trunk, upper limbs, lower limbs, scalp, ears, peribuccal, periocular, face, neck, chest, tummy, back, elbows, arms, axillae, hands and dorsal wrists, balms and wrists, buttocks and groin, popliteal space, thighs, legs, arches, and soles. In some embodiments, the excoriations are detected by a healthcare professional. In some embodiments, the excoriations are detected by the subject or the subject's adult guardian.

In some embodiments, the methods further comprise scoring the excoriations as mild, moderate, or severe according to the standards described herein. In some embodiments, the excoriations are scored as none (scored as 0), mild (scored as 1), moderate (scored as 2), or severe (scored as 3) according to the SCORAD, PO-SCORAD, ADAM, EASI, SA-EASI, SASSAD, SSS, and/or TIS method. In preferred embodiments, the excoriations are scored according to the SCORAD or PO-SCORAD method. In some embodiments, the excoriations are scored by a healthcare professional. In some embodiments, the excoriations are scored by the subject or the subject's adult guardian.

In some embodiments, the methods further comprise identifying the subject as likely to respond to nemolizumab treatment or the equivalent thereof if excoriations are detected that are scored as moderate to severe. In some embodiments, the methods further comprise determining that the subject having atopic dermatitis is likely to respond to nemolizumab treatment or treatment with an equivalent thereof if excoriations are detected that are scored as moderate to severe. In some embodiments, the methods further comprise predicting that a subject having atopic dermatitis is likely to respond to nemolizumab treatment or treatment with an equivalent thereof comprising if excoriations are detected that are scored as moderate to severe.

In some embodiments, the methods further comprise identifying the subject as not likely to respond to nemolizumab treatment or the equivalent thereof if no excoriations scored as none to mild are detected. In some embodiments, the methods further comprise determining that the subject having atopic dermatitis is not likely to respond to nemolizumab treatment or treatment with an equivalent thereof if no excoriations scored as none to mild are detected. In some embodiments, the methods further comprise predicting that a subject having atopic dermatitis is not likely to respond to nemolizumab treatment or treatment with an equivalent thereof comprising if no excoriations scored as none to mild are detected.

Pharmaceutical Compositions

Provided herein are pharmaceutical compositions for use in the treatment of atopic dermatitis in a subject determined to have one or more skin excoriations, the composition comprising, consisting of, or consisting essentially of nemolizumab or an equivalent thereof. Moreover, the present disclosure provides therapeutic agents for AD which comprise nemolizumab or an equivalent thereof as an active ingredient.

In some embodiments, the excoriations were previously detected and/or scored by a healthcare professional, by the subject, or by the subject's adult guardian. In some embodiments, the excoriations were scored according to one or more of the SCORAD, PO-SCORAD, ADAM, EASI, SA-EASI, SASSAD, SSS, and/or TIS method. In a preferred embodiment, the excoriations were scored according to the SCORAD or PO-SCORAD method. In some embodiments, the excoriations are scored as moderate to severe. In some embodiments, the excoriations have a score of 2 to 3. In some embodiments, the subject does not have skin excoriations that are scored as none to mild. In some embodiments, the excoriations do not have a score of 0 to 1. In some embodiments, the skin excoriations are not mild. In some embodiments, the scored excoriations are at a specific region or site of the subject's skin that comprises excoriations that are representative of the subject's average intensity of excoriations. In some embodiments, the scored excoriations are at a specific region or site of the subject's skin that comprises excoriations that are representative of the subject's worst intensity of excoriations. In some embodiments, the skin excoriations were caused by pruritus. In some embodiments, the subject has 1, 2, 3, 4, 5, 6, 7, 8, 9, 10, 11, 12, 13, 14, 15, 16, 17, 18, 19, 20, 30, 40, or 50 or more skin excoriations that are moderate to severe.

The phrase "comprise(s) nemolizumab or an equivalent thereof as an active ingredient" means comprising nemolizumab or an equivalent thereof as at least one of the active ingredients, and does not limit the proportion of the antibody. In addition, the therapeutic agents for AD in the present disclosure may also comprise, in combination with nemolizumab or an equivalent thereof, other ingredients that enhance the treatment of AD. For example, the composition may comprise one or more calcineurin inhibitors (e.g., a topical calcineurin inhibitor), emollients, topical steroids such as topical glucocorticoids, and oral antihistamines.

Pharmaceutical compositions of nemolizumab or an equivalent thereof of the present disclosure can be prepared as formulations according to standard methods (see, for example, Remington's Pharmaceutical Science, Mark Publishing Company, Easton, USA). In some embodiments, the pharmaceutical compositions comprise a carrier and/or additive. In some embodiments, the carrier is a pharmaceutically acceptable carrier. For example, in some embodiments, the pharmaceutical composition comprises one or more surfactants (for example, PEG and Tween), excipients, antioxidants (for example, ascorbic acid), coloring agents, flavoring agents, preservatives, stabilizers, buffering agents (for example, phosphoric acid, citric acid, and other organic acids), chelating agents (for example, EDTA), suspending agents, isotonizing agents, binders, disintegrators, lubricants, fluidity promoters, corrigents, light anhydrous silicic acid, lactose, crystalline cellulose, mannitol, starch, carmellose calcium, carmelose sodium, hydroxypropylcellulose, hydroxypropylmethylcellulose, polyvinylacetaldiethylaminoacetate, polyvinylpyrrolidone, gelatin, medium chain fatty acid triglyceride, polyoxyethylene hydrogenated castor oil 60, sucrose, carboxymethylcellulose, corn starch, and inorganic salt. In some embodiments, the pharmaceutical composition comprises one or more other low-molecular-weight polypeptides, proteins such as serum albumin, gelatin, and immunoglobulin, and amino acids such as glycine, glutamine, asparagine, arginine, and lysine.

When nemolizumab or an equivalent thereof is prepared as an aqueous solution for injection, nemolizumab or an equivalent thereof may be dissolved in an isotonic solution containing, for example, physiological saline, dextrose, or other adjuvants. The adjuvants may include, for example, D-sorbitol, D-mannose, D-mannitol, and sodium chloride. In addition, appropriate solubilizing agents, for example, alcohols (for example, ethanol), polyalcohols (for example, propylene glycols and PEGs), and non-ionic detergents (polysorbate 80 and HCO-50) may be used concomitantly.

If necessary, nemolizumab or an equivalent thereof may be encapsulated in microcapsules (microcapsules made of hydroxymethylcellulose, gelatin, polymethylmethacrylate, and the like), and made into components of colloidal drug delivery systems (liposomes, albumin microspheres, microemulsions, nano-particles, and nano-capsules) (for example, see "Remington's Pharmaceutical Science 16th edition" &, Oslo Ed. (1980)). Moreover, methods for making sustained-release drugs are known, and these can be applied for nemolizumab or an equivalent thereof (Langer et al., J. Biomed. Mater. Res. (1981) 15, 167-277; Langer, Chem. Tech. (1982) 12, 98-105; U.S. Pat. No. 3,773,919; European Patent Application (EP) No. 58,481; Sidman et al., Biopolymers (1983) 22, 547-56; EP 133,988).

The pharmaceutical compositions of the present disclosure can be administered either orally or parenterally, but are preferably administered parenterally. Specifically, the pharmaceutical compositions are administered to patients by injection or percutaneous administration. Injections include, for example, intravenous injections, intramuscular injections, and subcutaneous injections, for systemic or local administration. The pharmaceutical compositions may be given to sites where inflammation is to be suppressed, or areas surrounding the sites by local infusion or intramuscular injection. In some embodiments, the pharmaceutical compositions are administered at the site of one or more skin excoriations, or proximal to the site of one or more skin excoriations.

The administration methods can be properly selected according to the patient's age and condition. The single-administration dose can be selected, for example, from within the range of 0.0001 to 100 mg of the active ingredient per kg body weight. Alternatively, for example, when the agents are administered to human patients, the dose of the active ingredient can be selected from within the range of 0.001 to 1,000 mg/kg body weight. In some embodiments, the composition is formulated to administer a dose containing, for example, about 0.01 to 50 mg/kg, about 0.01 mg/kg to about 0.1 mg/kg, about 0.05 mg/kg to 0.15 mg/kg, about 0.1 mg/kg to about 0.6 mg/kg, about 0.1 mg/kg to about 1 mg/kg, about 0.25 mg/kg to about 0.75 mg/kg, about 0.4 mg/kg to about 0.8 mg/kg, about 0.4 mg/kg to about 1.8 mg/kg, about 0.5 to about 2.5 mg/kg, about 0.8 mg/kg to about 2.2 mg/kg, about 1 mg/kg to about 2.5 mg/kg, about 1 mg/kg to about 3.5 mg/kg, about 1 mg/kg to about 5 mg/kg, about 2 mg/kg to about 4 mg/kg, about 2.5 mg/kg to about 10 mg/kg, about 5 mg/kg to about 10 mg/kg, about 10 mg/kg to about 20 mg/kg, about 10 mg/kg to about 40 mg/kg, about 20 mg/kg to about 50 mg/kg, about 25 mg/kg to about 75 mg/kg, about 50 mg/kg to about 100 mg/kg, or about 100 mg/kg to about 500 mg/kg, or about 100 mg/kg to about 1000 mg/kg body weight of nemolizumab or an equivalent thereof. In preferred embodiments, the dose ranges from about 0.01 mg/kg to about 0.1 mg/kg, about 0.1 mg/kg to about 0.5 mg/kg, about 0.5 mg/kg to about 1.5 mg/kg, about 1.5 mg/kg to about 2.5 mg/kg, or about 2.5 mg/kg to about 10 mg/kg. In some embodiments, the dose is about 0.01 mg/kg, about 0.02 mg/kg, about 0.03 mg/kg, about 0.04 mg/kg, about 0.05 mg/kg, about 0.06 mg/kg, about 0.07 mg/kg, about 0.08 mg/kg, about 0.09 mg/kg, about 0.1 mg/kg, about 0.2 mg/kg, about 0.3 mg/kg, about 0.4 mg/kg, about 0.5 mg/kg, about 0.6 mg/kg, about 0.7 mg/kg, about 0.8 mg/kg, about 0.9 mg/kg, about 1 mg/kg, about 1.1 mg/kg, about 1.2 mg/kg, about 1.3 mg/kg, about 1.4 mg/kg, about 1.5 mg/kg, about 1.6 mg/kg, about 1.7 mg/kg, about 1.8 mg/kg, about 1.9 mg/kg, about 2 mg/kg, about 2.1 mg/kg, about 2.2 mg/kg, about 2.3 mg/kg, about 2.4 mg/kg, about 2.5 mg/kg, about 2.6 mg/kg, about 2.7 mg/kg, about 2.8 mg/kg, about 2.9 mg/kg, about 3 mg/kg, about 3.5 mg/kg, about 4 mg/kg, about 4.5 mg/kg, about 5 mg/kg, about 6 mg/kg, about 7 mg/kg, about 8 mg/kg, about 9 mg/kg, about 10 mg/kg, about 15 mg/kg, about 25 mg/kg, about 50 mg/kg, about 75 mg/kg, about 100 mg/kg, about 500 mg/kg, or about 1,000 mg/kg. In particular embodiments, the effective amount of nemolizumab or the equivalent thereof is about 0.1 mg/kg, about 0.5 mg/kg, about 1 mg/kg, about 1.5 mg/kg, about 2 mg/kg, or about 2.5 mg/kg. In a preferred embodiment, the dose is about 0.5 mg/kg.

In some embodiments, a single-administration dose can be selected, for example, from within the range of 1 to 100 mg of the active ingredient (i.e., nemolizumab or the equivalent thereof), or more specifically about 10 to about 90 mg, about 20 to about 80 mg, about 25 to about 70 mg, or about 30 to about 60 mg. For example, in some embodiments, a single-administration dose may be about 1 mg, about 5 mg, about 10 mg, about 15 mg, about 20 mg, about 25 mg, about 30 mg, about 35 mg, about 40 mg, about 45 mg, about 50 mg, about 55 mg, about 60 mg, about 65 about, about 70 mg, about 75 mg, about 80 mg, about 85 mg, about 90 mg, about 95 mg, or about 100 mg.

In some embodiments, the single-administration dose may vary over time. For example, a subject may receive an initial "loading dose(s)" that is higher that the "maintenance dose(s)" administrated thereafter. In some embodiments, a subject may be administered one or more initial loading doses of 60 mg of nemolizumab (or an equivalent thereof) followed by subsequent maintenance doses of 30 mg. In other embodiments, the initial dose and subsequent doses may be the same. For example, the initial dose and subsequent doses may be 60 mg. In any of these embodiments, the antibody (nemolizumab or the equivalent thereof) may be administered to the subject with or without a second active agent, such as a topical steroid or topical calcineurin inhibitor.

Methods of Treatment

In accordance with some embodiments, there are provided methods of selectively treating atopic dermatitis in a subject having one or more skin excoriations, the method comprising, consisting of, or consisting essentially of administering an effective amount of nemolizumab or an equivalent thereof to the subject.

In some embodiments, the excoriations were previously detected and/or scored by a healthcare professional, by the subject, or by the subject's adult guardian. In some embodiments, the excoriations were scored according to one or more of the SCORAD, PO-SCORAD, ADAM, EASI, SA- EASI, SASSAD, SSS, and/or TIS methods. In a preferred embodiment, the excoriations were scored according to the SCORAD or PO-SCORAD method. In some embodiments, the excoriations are scored as moderate to severe. In some embodiments, the excoriations have a score of 2 to 3. In some embodiments, the subject does not have skin excoriations that are scored as none to mild. In some embodiments, the excoriations do not have a score of 0 to 1. In some embodiments, the skin excoriations are not mild. In some embodiments, the scored excoriations are at a specific region or site of the subject's skin that comprises excoriations that are representative of the subject's average intensity of excoriations. In some embodiments, the scored excoriations are at a specific region or site of the subject's skin that comprises excoriations that are representative of the subject's worst intensity of excoriations. In some embodiments, the skin excoriations were caused by pruritis. In some embodiments, the subject has 1, 2, 3, 4, 5, 6, 7, 8, 9, 10, 11, 12, 13, 14, 15, 16, 17, 18, 19, 20, 30, 40, or 50 or more skin excoriations that are moderate to severe.

An "effective amount" is an amount sufficient to effect beneficial or desired results such as alleviating at least one or more symptom of AD and/or pruritus. An effective amount as used herein would also include an amount sufficient to delay the development of AD and/or pruritus, alter the course of an AD and/or pruritus symptom (for example sleep efficiency), or reverse a symptom of AD and/or pruritus. Thus, it is not possible to specify the exact "effective amount." However, for any given case, an appropriate "effective amount" can be determined by one of ordinary skill in the art using only routine experimentation.

An effective amount can be administered in one or more administrations, applications or dosages. Such delivery is dependent on a number of variables including the time period for which the individual dosage unit is to be used, the bioavailability of the therapeutic agent, the route of administration, etc. It is understood, however, that specific dose levels of the therapeutic agents of the present disclosure for any particular subject depends upon a variety of factors including the activity of the specific compound employed, the age, body weight, general health, sex, and diet of the subject, the time of administration, the rate of excretion, the drug combination, and the severity of the particular disorder being treated and form of administration. Treatment dosages generally may be titrated to optimize safety and efficacy. The dosage can be determined by a physician and adjusted, as necessary, to suit observed effects of the treatment. Typically, dosage-effect relationships from in vitro and/or in vivo tests initially can provide useful guidance on the proper doses for patient administration. In general, one will desire to administer an amount of the compound that is effective to achieve a serum level commensurate with the concentrations found to be effective in vitro. Determination of these parameters is well within the skill of the art. These considerations, as well as effective formulations and administration procedures are well known in the art and are described in standard textbooks.

In some embodiments, the dose of nemolizumab or an equivalent thereof administered to the subject is within the range of 0.001 to 1,000 mg/kg body weight of the subject. In some embodiments, the dose ranges from about 0.01 to 50 mg/kg, about 0.01 mg/kg to about 0.1 mg/kg, about 0.05 mg/kg to 0.15 mg/kg, about 0.1 mg/kg to about 0.6 mg/kg, about 0.1 mg/kg to about 1 mg/kg, about 0.25 mg/kg to about 0.75 mg/kg, about 0.4 mg/kg to about 0.8 mg/kg, about 0.4 mg/kg to about 1.8 mg/kg, about 0.5 to about 2.5 mg/kg, about 0.8 mg/kg to about 2.2 mg/kg, about 1 mg/kg to about 2.5 mg/kg, about 1 mg/kg to about 3.5 mg/kg, about 1 mg/kg to about 5 mg/kg, about 2 mg/kg to about 4 mg/kg, about 2.5 mg/kg to about 10 mg/kg, about 5 mg/kg to about 10 mg/kg, about 10 mg/kg to about 20 mg/kg, about 10 mg/kg to about 40 mg/kg, about 20 mg/kg to about 50 mg/kg, about 25 mg/kg to about 75 mg/kg, about 50 mg/kg to about 100 mg/kg, or about 100 mg/kg to about 500 mg/kg, or about 100 mg/kg to about 1000 mg/kg body weight of nemolizumab or an equivalent thereof. In preferred embodiments, the dose ranges from about 0.01 mg/kg to about 0.1 mg/kg, about 0.1 mg/kg to about 0.5 mg/kg, about 0.5 mg/kg to about 1.5 mg/kg, about 1.5 mg/kg to about 2.5 mg/kg, or about 2.5 mg/kg to about 10 mg/kg. In some embodiments, the dose is about 0.01 mg/kg, about 0.02 mg/kg, about 0.03 mg/kg, about 0.04 mg/kg, about 0.05 mg/kg, about 0.06 mg/kg, about 0.07 mg/kg, about 0.08 mg/kg, about 0.09 mg/kg, about 0.1 mg/kg, about 0.2 mg/kg, about 0.3 mg/kg, about 0.4 mg/kg, about 0.5 mg/kg, about 0.6 mg/kg, about 0.7 mg/kg, about 0.8 mg/kg, about 0.9 mg/kg, about 1 mg/kg, about 1.1 mg/kg, about 1.2 mg/kg, about 1.3 mg/kg, about 1.4 mg/kg, about 1.5 mg/kg, about 1.6 mg/kg, about 1.7 mg/kg, about 1.8 mg/kg, about 1.9 mg/kg, about 2 mg/kg, about 2.1 mg/kg, about 2.2 mg/kg, about 2.3 mg/kg, about 2.4 mg/kg, about 2.5 mg/kg, about 2.6 mg/kg, about 2.7 mg/kg, about 2.8 mg/kg, about 2.9 mg/kg, about 3 mg/kg, about 3.5 mg/kg, about 4 mg/kg, about 4.5 mg/kg, about 5 mg/kg, about 6 mg/kg, about 7 mg/kg, about 8 mg/kg, about 9 mg/kg, about 10 mg/kg, about 15 mg/kg, about 25 mg/kg, about 50 mg/kg, about 75 mg/kg, about 100 mg/kg, about 500 mg/kg, or about 1,000 mg/kg. In particular embodiments, the effective amount of nemolizumab or the equivalent thereof is about 0.1 mg/kg, about 0.5 mg/kg, about 1 mg/kg, about 1.5 mg/kg, about 2 mg/kg, or about 2.5 mg/kg. In a preferred embodiment, the dose is about 0.5 mg/kg.

In some embodiments, a single-administration dose can be selected, for example, from within the range of 1 to 100 mg of the active ingredient (i.e., nemolizumab or the equivalent thereof), or more specifically about 10 to about 90 mg, about 20 to about 80 mg, about 25 to about 70 mg, or about 30 to about 60 mg. For example, in some embodiments, a single-administration dose may be about 1 mg, about 5 mg, about 10 mg, about 15 mg, about 20 mg, about 25 mg, about 30 mg, about 35 mg, about 40 mg, about 45 mg, about 50 mg, about 55 mg, about 60 mg, about 65 about, about 70 mg, about 75 mg, about 80 mg, about 85 mg, about 90 mg, about 95 mg, or about 100 mg.

In some embodiments, the single-administration dose may vary over time. For example, a subject may receive an initial "loading dose(s)" that is higher that the "maintenance dose(s)" administrated thereafter. In some embodiments, a subject may be administered one or more initial loading doses of 60 mg of nemolizumab (or an equivalent thereof) followed by subsequent maintenance doses of 30 mg. In other embodiments, the initial dose and subsequent doses may be the same. For example, the initial dose and subsequent doses may be 60 mg. In any of these embodiments, the antibody (nemolizumab or the equivalent thereof) may be administered to the subject with or without a second active agent, such as a topical steroid or topical calcineurin inhibitor.

In some embodiments of the methods, the nemolizumab or the equivalent thereof is administered by a topical or parenteral route. In some embodiments of the methods, the nemolizumab or the equivalent thereof is administered subcutaneously. In some embodiments, the dose is administered subcutaneously at or proximal to a site of one or more excoriations.

In some embodiments, nemolizumab or the equivalent thereof is administered daily, every other day, twice per week, three times per week, four times per week, five times per week, six times per week, once per week, once every two weeks, once every three weeks, once every four weeks, once every five weeks, once every six weeks, once every seven weeks, once every eight weeks, once every nine weeks, once every 10 weeks, once every 11 weeks, once every 12 weeks, twice per year, once per year, and/or as needed based on the appearance of symptoms of atopic dermatitis or pruritus. In preferred embodiments, nemolizumab or the equivalent thereof is administered every four weeks or every eight weeks.

In particular embodiments, both the dose and dosing schedule may be determined before commencing the method of treatment. For example, a subject may be administered about 30 to about 60 mg of nemolizumab or an equivalent thereof once every two weeks (Q2W), once every three weeks (Q3W), once every four weeks (Q4W), once every five weeks (Q5W), once every six weeks (Q6W), once every seven weeks (Q7W), or once every eight weeks (Q8W), either alone or in combination with a second active agent (e.g., a topical steroid or topical calcineurin inhibitor). In some embodiments, a subject may be administered an initial loading dose of 60 mg of nemolizumab or an equivalent thereof and thereafter receive maintenance doses of 30 mg of nemolizumab or an equivalent thereof once every four weeks (Q4W). In some embodiments, the maintenance doses may be administered as infrequently as once every eight weeks (Q8W). Such a treatment regimen may be administered with or without concurrent use of a topical steroid or topical calcineurin inhibitor. In another embodiment, a subject may be administered a dose of 60 mg of nemolizumab or an equivalent thereof once every four weeks (Q4W) without a decrease in the dose over time. In some embodiments, the doses may be administered as infrequently as once every eight weeks (Q8W). Such a treatment regimen may be administered with or without concurrent use of a topical steroid or topical calcineurin inhibitor.

Alternatively, doses for a particular regimen may be administered according to the weight of the subject (e.g., mg/kg), rather than a pre-set dose. For example, a subject may be administered about 0.1 to about 2.0 mg/kg of nemolizumab or an equivalent thereof once every two weeks (Q2W), once every three weeks (Q3W), once every four weeks (Q4W), once every five weeks (Q5W), once every six weeks (Q6W), once every seven weeks (Q7W), or once every eight weeks (Q8W), either alone or in combination with a second active agent (e.g., a topical steroid or topical calcineurin inhibitor). In some embodiments, a subject may be administered an initial loading dose of 0.1, 0.5, or 2.0 mg/kg of nemolizumab or an equivalent thereof and thereafter receive maintenance doses of nemolizumab or an equivalent thereof once every four weeks (Q4W) that is less than the initial loading dose. In some embodiments, the maintenance doses may be administered as infrequently as once every eight weeks (Q8W). Such a treatment regimen may be administered with or without concurrent use of a topical steroid or topical calcineurin inhibitor. In another embodiment, a subject may be administered a dose of 0.1, 0.5, or 2.0 mg/kg of nemolizumab or an equivalent thereof once every four weeks (Q4W) without a decrease in the dose over time. In some embodiments, the doses may be administered as infrequently as once every eight weeks (Q8W). Such a treatment regimen may be administered with or without concurrent use of a topical steroid or topical calcineurin inhibitor.

In some embodiments, the duration of treatment is about one day, about one week, about two weeks, about three weeks, about four weeks, about five weeks, about six weeks, about seven weeks, about eight weeks, about nine weeks, about 10 weeks, about 11 weeks, about 12 weeks, about 13 weeks, about 14 weeks, about 15 weeks, about 16 weeks, about 17 weeks, about 18 weeks, about 19 weeks, about 20 weeks, about 24 weeks, about 30 weeks, about 36 weeks, about 40 weeks, about 48 weeks, about 50 weeks, about one year, about two years, about three years, about four years, about five years, or as needed based on the appearance of symptoms of atopic dermatitis. In preferred embodiments, duration of treatment is about 12 weeks to about 24 weeks, about 12 to about 36 weeks, about 12 to about 48 weeks, or about 24 to about 36 weeks.

In accordance with some embodiments, there are provided uses of nemolizumab or an equivalent thereof in the manufacture of a medicament for the treatment of atopic dermatitis in a subject having one or more skin excoriations. In some embodiments, the excoriations were previously detected and/or scored by a healthcare professional, by the subject, or by the subject's adult guardian. In some embodiments, the excoriations were scored according to one or more of the SCORAD, PO-SCORAD, ADAM, EASI, SA-EASI, SASSAD, SSS, and/or TIS methods. In a preferred embodiment, the excoriations were scored according to the SCORAD or PO-SCORAD method. In some embodiments, the excoriations are scored as moderate to severe. In some embodiments, the excoriations have a score of 2 to 3. In some embodiments, the subject does not have skin excoriations that are scored as none to mild. In some embodiments, the excoriations do not have a score of 0 to 1. In some embodiments, the skin excoriations are not mild. In some embodiments, the scored excoriations are at a specific region or site of the subject's skin that comprises excoriations that are representative of the subject's average intensity of excoriations. In some embodiments, the scored excoriations are at a specific region or site of the subject's skin that comprises excoriations that are representative of the subject's worst intensity of excoriations. In some embodiments, the skin excoriations were caused by pruritus. In some embodiments, the subject has 1, 2, 3, 4, 5, 6, 7, 8, 9, 10, 11, 12, 13, 14, 15, 16, 17, 18, 19, 20, 30, 40, or 50 or more skin excoriations that are moderate to severe.

In accordance with some embodiments, there are provided methods of treating a patient having atopic dermatitis, the method comprising, consisting of, or consisting essentially of: (a) screening the patient having atopic dermatitis for skin excoriations; and (b) treating the patient screened in step (a) by administering an effective amount of nemolizumab or an equivalent thereof. In some embodiments, the patient screened in step (a) has skin excoriations. In some embodiments, screening comprising detecting and/or scoring excoriations. In some embodiments, excoriations are scored according to one or more of the SCORAD, PO-SCORAD, ADAM, EASI, SA-EASI, SASSAD, SSS, and/or TIS methods. In a preferred embodiment, the excoriations are scored according to the SCORAD or PO-SCORAD method. In some embodiments, the excoriations are scored as moderate to severe. In some embodiments, the excoriations have a score of 2 to 3. In some embodiments, the patient does not have skin excoriations that are scored as none to mild. In some embodiments, the excoriations do not have a score of 0 to 1. In some embodiments, the skin excoriations are not mild. In some embodiments, the excoriations are screened at a specific region or site of the patient's skin that comprises excoriations that are representative of the patient's average intensity of excoriations. In some embodiments, the excoriations are screened at a specific region or site of the patient's skin that comprises excoriations that are representative of the patient's worst intensity of excoriations. In some embodiments, the skin excoriations were caused by pruritus. In some embodiments, the patient has 1, 2, 3, 4, 5, 6, 7, 8, 9, 10, 11, 12, 13, 14, 15, 16, 17, 18, 19, 20, 30, 40, or 50 or more skin excoriations that are moderate to severe.

In accordance with some embodiments, there are provided methods of improving sleep quality in a subject suffering from atopic dermatitis and having one or more skin excoriations, the method comprising administering an effective amount of nemolizumab or an equivalent thereof to the subject. In some embodiments, an improvement of sleep quality is determined by detecting an improvement in one or more of: time of sleep onset latency, total sleep time, sleep efficiency, or time of waking after sleep onset. As described above, sleep efficiency is defined as the total amount of sleeping time divided by the total time in bed. In some embodiments, sleep quality is recorded or detected by one or more of actigraphy, motion sensing, video monitoring, and/or self-reporting. In some embodiments, the excoriations were previously detected and/or scored by a healthcare professional, by the subject, or by the subject's adult guardian. In some embodiments, the excoriations were scored according to one or more of the SCORAD, PO-SCORAD, ADAM, EASI, SA-EASI, SAS SAD, SSS, and/or TIS method. In a preferred embodiment, the excoriations were scored according to the SCORAD or PO-SCORAD method. In some embodiments, the excoriations are scored as moderate to severe. In some embodiments, the excoriations have a score of 2 to 3. In some embodiments, the subject does not have skin excoriations that are scored as none to mild. In some embodiments, the excoriations do not have a score of 0 to 1. In some embodiments, the skin excoriations are not mild. In some embodiments, the scored excoriations are at a specific region or site of the subject's skin that comprises excoriations that are representative of the subject's average intensity of excoriations. In some embodiments, the scored excoriations are at a specific region or site of the subject's skin that comprises excoriations that are representative of the subject's worst intensity of excoriations. In some embodiments, the skin excoriations were caused by pruritus. In some embodiments, the subject has 1, 2, 3, 4, 5, 6, 7, 8, 9, 10, 11, 12, 13, 14, 15, 16, 17, 18, 19, 20, 30, 40, or 50 or more skin excoriations that are moderate to severe.

Success of treatment with nemolizumab or an equivalent thereof can be determined or assessed by detecting improvement, alleviation, ablation, or amelioration of AD, pruritus, or one or more symptoms of each thereof. For example, success can be determined by detecting an improvement in one or more of: number of skin excoriations, intensity of skin excoriations, excoriation score, the subject's pruritus VAS score, the subject's DLQI score, sleep efficiency, sleep onset latency, total sleep time, waking after sleep onset, percent body surface area affected, the subject's EASI score, the subject's IGA score, degree or amount of dry skin, frequency or presence of itching, severity of itching, redness of skin, frequency of raised bumps, degree or amount of thickened skin, degree or amount of cracked skin, degree or amount of scaly skin, degree or amount of raw skin, degree or amount of skin sensitivity, and/or degree or amount of swollen skin. In some embodiments, success does not depend on whether or not AD and/or pruritus is considered to be "cured" or "healed" and whether or not all symptoms are resolved.

Example

A randomized, double-blind, placebo-controlled, dose-finding study was performed to assess the long-term efficacy and safety of continuous subcutaneous nemolizumab when injected every four weeks (Q4W) or every 8 weeks (Q8W) in patients with moderate-to-severe atopic dermatitis that was inadequately controlled by topical treatments. The study was published in Kabashima, et al., *J Allergy Clin Immunol* (2018) 142(4)1121, which publication, including the figures, is incorporated in its entirety by reference. In the primary end point analysis, nemolizumab administered every 4 weeks (Q4W) significantly improved pruritus from baseline at week 12, as assessed by using the pruritus visual analog scale (VAS). Percentage reductions in pruritus VAS scores of −44% in the 0.1-mg/kg group, −60% in the 0.5-mg/kg group, and −63% in the 2.0-mg/kg group were reported versus −21% in the placebo group (P<0.01 for all comparisons). Improvements in AD disease severity and body surface involvement, as well as sleep disturbance, were also observed at week 12 versus placebo.

Methods
Study Design.

Figure 4:
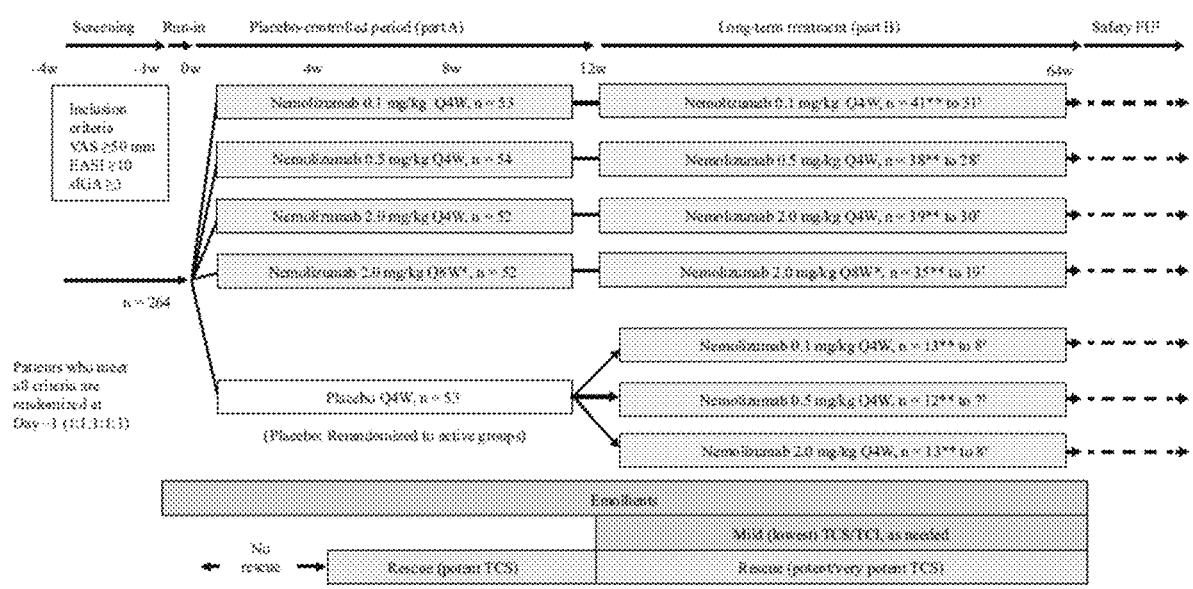
FIG. 4. Graphical depiction of the study design. *Patients in the nemolizumab 2.0 mg/kg Q8W group received placebo at week 4 during part A; during part B, patients received placebo at week 12, nemolizumab at week 16, and then alternating doses of placebo and nemolizumab. **Number of patients who randomized to part B. †Number of patients at week 64. ‡Safety follow-up was performed 12 weeks after the last dose of study drug. FU, Follow-up; TCI, topical calcineurin inhibitor; TCS, topical glucocorticosteroid; w, week.

This study was performed in 2 parts (FIG. 4). For Part A, nemolizumab was a 12-week evaluation of 4 dose regimens of nemolizumab, 0.1, 0.5, or 2.0 mg/kg administered subcutaneously Q4W and 2.0 mg/kg administered subcutaneously Q8W, or placebo administered subcutaneously Q4W. On completion of Part A, patients entered the double-blind extension phase and continued to receive nemolizumab at the previously assigned dose for a further 52 weeks (weeks 12-64, Part B). Patients randomized previously to placebo in Part A were re-randomized to nemolizumab (0.1, 0.5, or 2.0 mg/kg subcutaneous Q4W) in Part B at a 1:1:1 ratio by using a centralized interactive voice or online response system (placebo-treated patients were not rerandomized to nemolizumab 2.0 mg/kg Q8W). All patients were required to enter Part B within 7 days of the final visit in Part A. To maintain blinding in Part B, the study monitoring team, study site personnel, and other site/company personnel remained blind to treatment allocation until the final database after study completion was locked. The study was performed in accordance with the guidelines for Good Clinical Practice and the Declaration of Helsinki. Local ethics committee or institutional review board approval was obtained for each study center. Written informed consent was provided by all patients.

Study Population.

Key inclusion criteria are described in FIG. 4. Patients were required to have completed the Part A treatment period and provided written informed consent for participation in the extension phase to enter Part B.

Study Procedures.

In Part B of the study, patients received treatment with 1 of 3 doses of nemolizumab (0.1, 0.5, or 2.0 mg/kg) administered subcutaneously Q4W or nemolizumab 2.0 mg/kg administered subcutaneously Q8W for 52 weeks. To maintain blinding, patients receiving nemolizumab Q8W were administered placebo at week 12 (last visit for Part A), nemolizumab at week 16, and then alternating doses of placebo and nemolizumab. Patients were permitted to use emollients, localized treatments (e.g., eye drops), mild topical glucocorticosteroids (including prednisolone), topical calcineurin inhibitors, and antihistamines (excluding nonselective H1 antihistamines). Patients with little or no improvement in pruritus VAS scores (range, 0 mm [no itch] to 100 mm [worst imaginable itch]) and static Investigator's Global Assessment (sIGA) scores (range, 0 [clear] to 5 [very severe disease]) in the opinion of the investigator were allowed to use a "potent" topical glucocorticosteroid, such as mometasone furoate 0.1%, as a rescue therapy in part A (at or after week 4) and a "potent" or "very potent" topical glucocorticosteroid, such as clobetasol propionate 0.05%, in Part B.

Study Assessments.

Baseline assessments for patients re-randomized from placebo to nemolizumab in Part B were performed at the final visit of Part A or at a separate visit. Patients attended study visits Q4W from week 12 to week 64 and a safety follow-up visit 12 weeks (±5 days) after the last dose of study drug. For consistency, patients were evaluated by the same assessor (when possible) at all visits. Assessor training was performed to minimize inter-site and inter-investigator variation. Efficacy assessments were performed Q4W from week 16 to week 64 and at a withdrawal visit as soon as possible after drug discontinuation. The pruritus VAS, pruritus verbal rating scale (VRS; which measures pruritus intensity on a scale from 0 [no itch] to 4 [very severe itch]), and sleep disturbance VAS (which ranges from 0 [no sleep loss] to 100 [inability to sleep at all]) were completed by patients every 7 days during Part B.

Study End Points.

The primary efficacy end point, percentage improvement from baseline at week 12 in pruritus VAS score, was assessed during Part A. Secondary efficacy end points assessed in Part B (weeks 12-64) included improvement from baseline values in the following: pruritus VAS score, Eczema Area and Severity Index (EAST) score (range, 0-72, with higher scores indicating worse disease severity), SCORing Atopic Dermatitis (SCORAD; range, 0-103, with higher scores indicating more severe disease), body surface area (BSA) of AD involvement, and sleep disturbance VAS score. Secondary end points also included the proportion of patients with 25%, 50%, and 75% improvement from baseline in pruritus VAS and EASI scores; the proportion of patients with a 2-point or greater improvement from baseline in sIGA and pruritus VRS scores; and the proportion of patients receiving rescue therapy. The proportion of patients who achieved a pruritus VAS score of less than 30 mm (no or mild itch) was explored in a post hoc analysis. Exploratory efficacy outcomes in part B included the frequency, duration, and amount of topical glucocorticosteroid used as a rescue therapy and Dermatology Life Quality Index score (DLQI; measured on a scale of 0-30, with higher scores representing greater impairment). A change in DLQI score of 4 points or greater, which was considered a minimal clinically important difference, was explored in a post hoc analysis. The long-term safety profile was also evaluated.

Statistical Analysis.

Secondary and exploratory end points in Part B were summarized by using descriptive statistics, and no formal statistical comparisons were performed in Part B. No imputation was performed for missing data. Data measured during or after rescue therapy were included in the analyses. The intent-to-treat population, which included all randomized patients who had received at least 1 dose of nemolizumab in Part A or B and had at least 1 postdose efficacy assessment, was used for efficacy analyses. All patients who had received at least 1 dose of nemolizumab in Parts A or B were included in the safety analyses. Efficacy and safety analyses were performed separately for patients who received nemolizumab throughout the 64-week study period (patients randomized to nemolizumab in part A and B) and patients who switched from placebo to nemolizumab at week 12 (patients randomized to placebo in part A and re-randomized to nemolizumab in Part B).

Results

Figure 5:
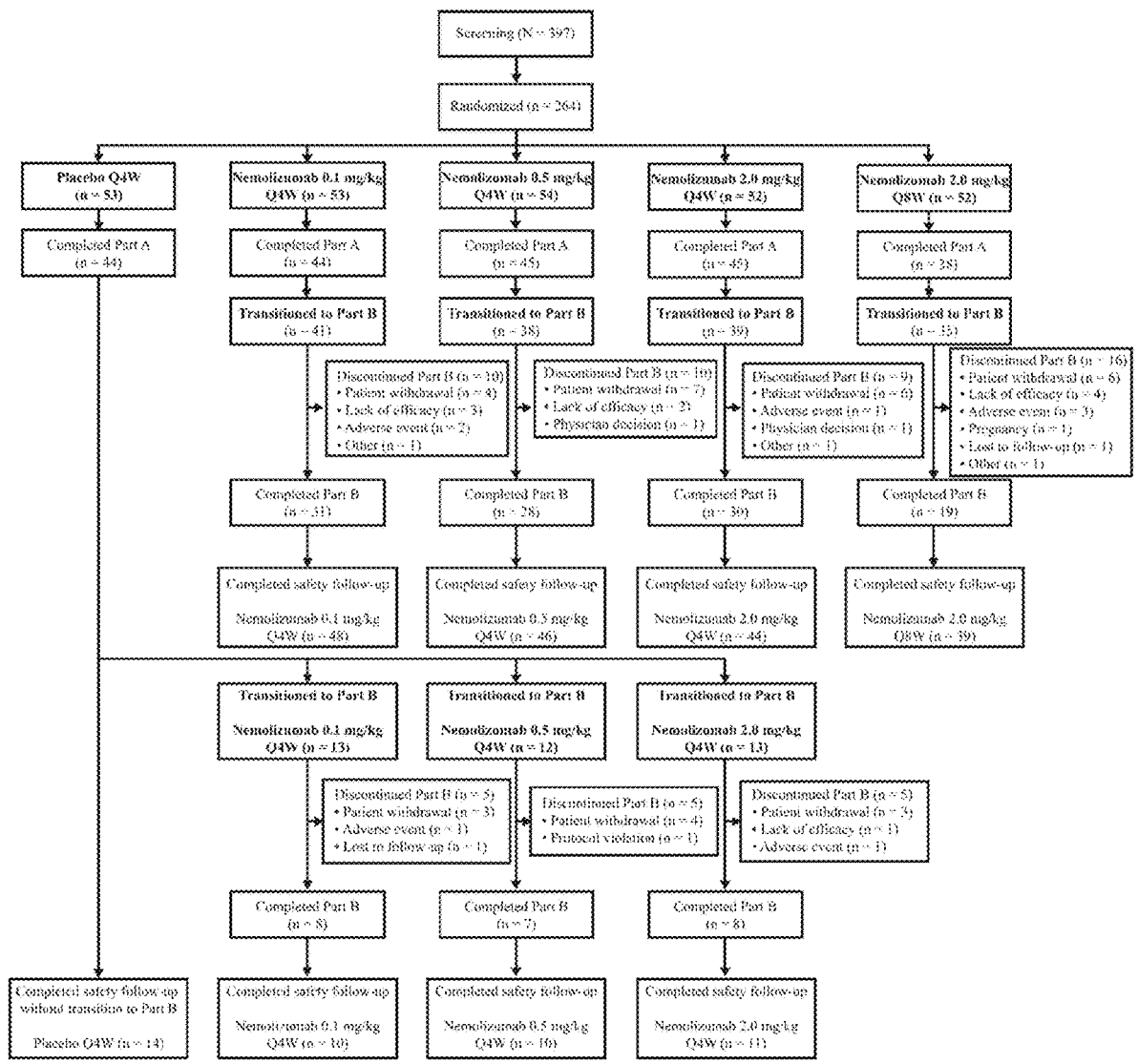
FIG. 5. Graphical depiction of the results from part A and part B of the phase II study.

In total, 264 patients were randomized to Part A; of these, 216 completed Part A, and 191 participated in Part B, including 38 re-randomized from the placebo group (see FIG. 5). Of the 191 patients who participated in Part B, 131 (69%) completed part B. The most common reasons for discontinuation from part B were patient withdrawal from the study (33/191 [17%]), followed by lack of efficacy (10/191 [5%]) and AEs (8/191 [4%]). The intent-to-treat population included 248 patients (211 patients randomized to nemolizumab in Part A and 37 patients rerandomized to nemolizumab who received placebo in Part A [1 re-randomized patient had no evaluable postdose efficacy data]). The safety population included 249 patients (211 randomized to nemolizumab in Part A and 38 rerandomized to nemolizumab who received placebo in part A). Overall, 84% (222/264) of patients who entered the study in Part A or B completed a safety follow-up 12 weeks after the last dose of study medication.

Patients had intense itch at baseline according to the pruritus visual analog scale (VAS) score and moderate-to-severe disease according to the static investigator's global assessment (sIGA), body surface area (BSA) affected by AD, and eczema area and severity index (EAST) scores. Mean baseline total serum IgE levels are reported in Table 3. The most common current accompanying allergy was allergic rhinitis (n=91), and the most frequent history of allergy was asthma (n=34). Demographics, baseline characteristics, and baseline severity of AD among patients receiving placebo in Part A who were re-randomized to nemolizumab Q4W in Part B were similar between groups.

TABLE 3

Baseline total serum IgE levels in intent to treat (ITT) population.

| | | Nemolizumab | | | |
|---|---|---|---|---|---|
| | Placebo (n = 53)** | 0.1 mg/kg Q4W (n = 53) | 0.5 mg/kg Q4W (n = 54) | 2.0 mg/kg Q4W (n = 52) | 2.0 mg/kg Q8W (n = 52) |
| Total serum IgE levels (kU/L) | | | | | |
| | (n = 53) | (n = 53) | (n = 54) | (n = 51) | (n = 52) |
| Mean | 6,338 | 10,599 | 5,496 | 6,247 | 8,997 |
| SD | 11,389 | 15,919 | 9,074 | 17,182 | 20,433 |

Figure 6A:
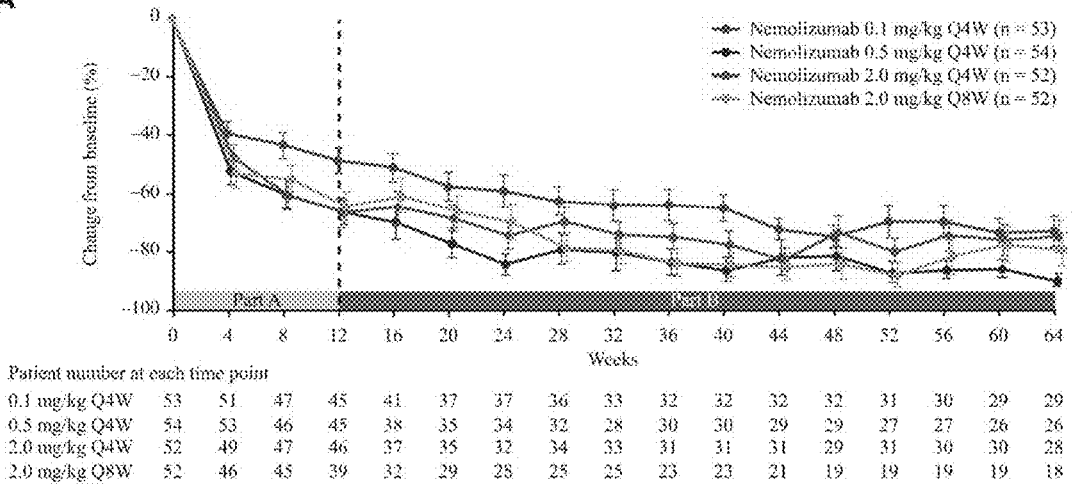
FIGS. 6A-6B. Depicts pruritus visual analog scale (VAS) scores.
Figure 6B:
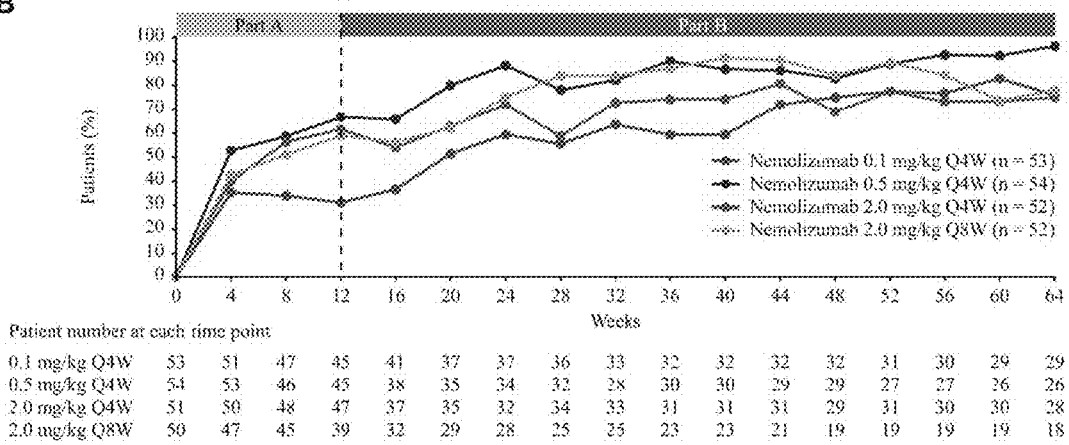
Figure 7A:
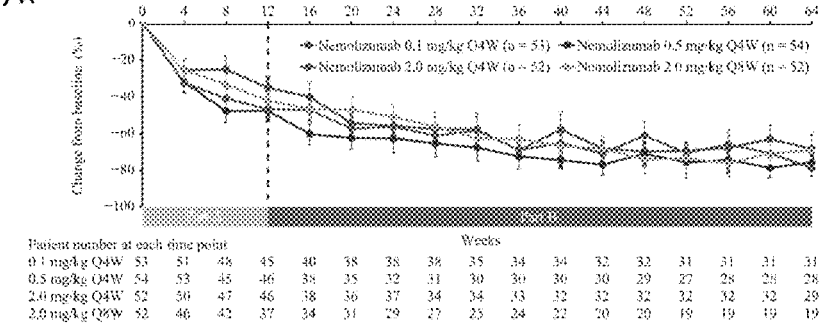
FIGS. 7A-7D. Graphical depiction of change from baseline in key secondary and exploratory end points for the intent-to-treat (ITT) population who received nemolizumab in part A (includes data after rescue therapy).
Figure 7B:
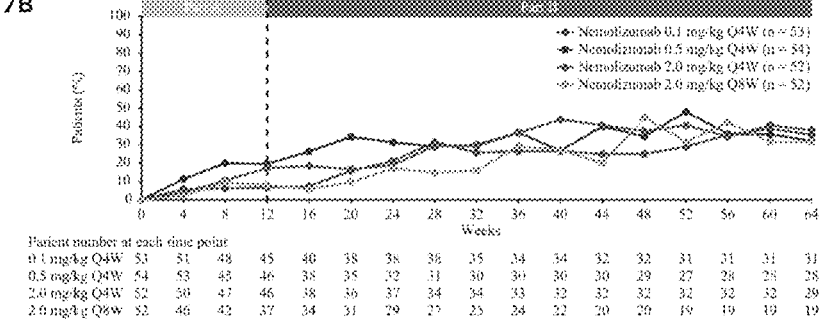
Figure 7C:
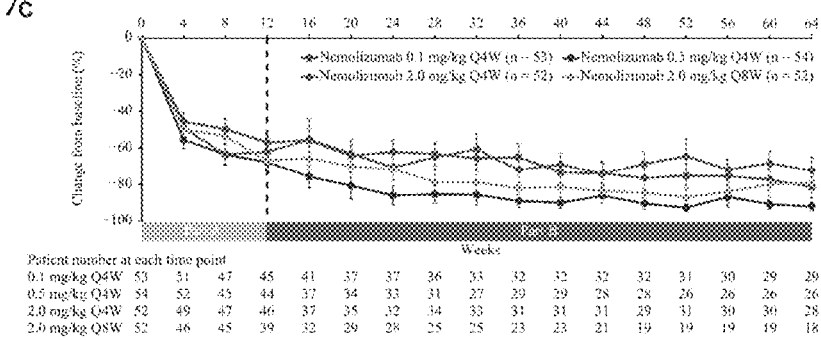
Figure 7D:
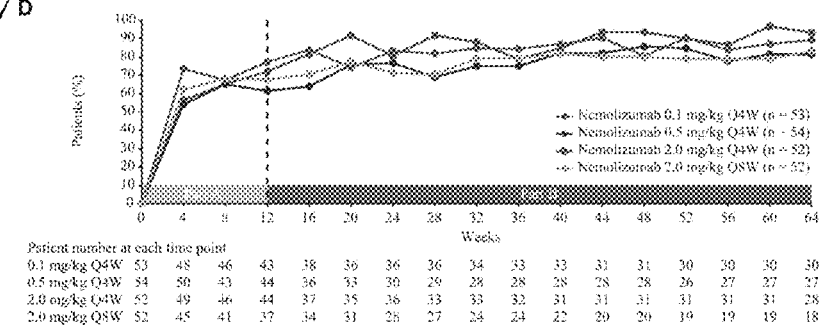

The improvement from baseline in pruritus VAS score observed in part A was maintained or increased from week 12 to week 64 in patients randomized to receive nemolizumab throughout the 64-week study period (see FIG. 6). The greatest improvement throughout the study was observed in the 0.5-mg/kg nemolizumab group (see Table 4). The proportion of patients who achieved a pruritus VAS score of less than 30 mm was maintained until week 64 (FIGS. 6B, and 4). The mean±SD percentage change from baseline in EASI score, SCORing atopic dermatitis (SCORAD) score, BSA affected, and sleep disturbance VAS score and the proportion of patients with a 2-point or greater improvement in sIGA or pruritus verbal rating scores (VRS)

were also maintained or increased from week 12 to week 64 in patients who had received nemolizumab in Part A (FIG. 7A-C, and Table 4 below). Approximately two thirds (68%, 68%, and 66%) of patients in the 0.1-, 0.5-, and 2.0-mg/kg Q4W nemolizumab groups, respectively, and almost three quarters (74%) of patients in the 2.0-mg/kg Q8W group who remained on therapy at week 64 had a 75% improvement in EASI score (Table 5 below).

TABLE 4

Percentage change from baseline in secondary and exploratory end points at week 12 and week 64 in intent to treat (ITT) population who received nemolizumab in part A.

| | Nemolizumab | | | |
|---|---|---|---|---|
| | 0.1 mg/kg Q4W (n = 53) | 0.5 mg/kg Q4W (n = 54) | 2.0 mg/kg Q4W (n = 52) | 2.0 mg/kg Q8W (n = 52) |
| | Percentage change in pruritus VAS score, mean ± SD | | | |
| Week 12 | (n = 45)—48.6 ± 28.3 | (n = 45)—66.3 ± 33.7 | (n = 46)—66.3 ± 29.0 | (n = 39)—64.1 ± 31.6 |
| Week 64 | (n = 29)—73.0 ± 28.4 | (n = 26)—89.6 ± 11.2 | (n = 28)—74.7 ± 28.4 | (n = 18)—79.1 ± 24.2 |
| | Patients with pruritus VAS score <30 mm,* no. (%) | | | |
| Week 12 | (n = 45) 14 (31) | (n = 45) 30 (67) | (n = 47) 29 (62) | (n = 39) 23 (59) |
| Week 64 | (n = 29) 22 (76) | (n = 26) 25 (96) | (n = 28) 21 (75) | (n = 18) 14 (78) |
| | Percentage change in EASI score, mean ± SD | | | |
| Week 12 | (n = 45)—35.1 ± 47.9 | (n = 46)—47.8 ± 45.4 | (n = 46)—46.8 ± 35.2 | (n = 37)—42.1 ± 40.8 |
| Week 64 | (n = 31)—68.5 ± 41.6 | (n = 28)—75.8 ± 25.4 | (n = 29)—78.9 ± 24.3 | (n = 19)—69.3 ± 44.0 |
| | Percentage change in SCORAD score, mean ± SD | | | |
| Week 12 | (n = 39)—36.4 ± 22.2 | (n = 40)—42.2 ± 30.7 | (n = 41)—42.6 ± 27.1 | (n = 32)—41.9 ± 20.8 |
| Week 64 | (n = 28)—56.6 ± 28.3 | (n = 23)—64.0 ± 27.7 | (n = 26)—66.6 ± 19.9 | (n = 18)—63.1 ± 28.0 |
| | Patients with ≥2-point improvement in sIGA score, no. (%) | | | |
| Week 12 | (n = 45) 12 (27) | (n = 46) 16 (35) | (n = 46) 11 (24) | (n = 37) 7 (19) |
| Week 64 | (n = 31) 18 (58) | (n = 28) 18 (64) | (n = 29) 19 (66) | (n = 19) 9 (47) |
| | Patients with sIGA score of 0 or 1, no. (%) | | | |
| Week 12 | (n = 45) 3 (7) | (n = 46) 9 (20) | (n = 46) 8 (17) | (n = 37) 3 (8) |
| Week 64 | (n = 31) 11 (35) | (n = 28) 9 (32) | (n = 29) 11 (38) | (n = 19) 6 (32) |
| | Percentage change in BSA affected by AD, mean ± SD | | | |
| Week 12 | (n = 45)—24.5 ± 49.8 | (n = 46)—25.3 ± 63.4 | (n = 46)—25.9 ± 44.4 | (n = 37)—18.6 ± 52.3 |
| Week 64 | (n = 31)—62.5 ± 40.9 | (n = 28)—66.0 ± 36.4 | (n = 29)—63.4 ± 40.4 | (n = 19)—60.5 ± 56.0 |
| | Patients with ≥2-point improvement in pruritus VRS score, no. (%) | | | |
| Week 12 | (n = 45) 10 (22) | (n = 44) 24 (55) | (n = 46) 17 (37) | (n = 39) 21 (54) |
| Week 64 | (n = 29) 17 (59) | (n = 26) 20 (77) | (n = 28) 17 (61) | (n = 18) 13 (72) |
| | Percentage change in sleep disturbance VAS score, mean ± SD | | | |
| Week 12 | (n = 45)—56.9 ± 34.4 | (n = 44)—67.8 ± 42.5 | (n = 46)—62.0 ± 52.2 | (n = 39)—66.9 ± 34.4 |
| Week 64 | (n = 29)—81.5 ± 31.9 | (n = 26)—92.2 ± 11.9 | (n = 28)—72.5 ± 38.1 | (n = 18)—79.5 ± 32.2 |
| | Patients with ≥4-point decrease in DLQI score,* no. (%) | | | |
| Week 12 | (n = 43) 31 (72) | (n = 44) 27 (61) | (n = 44) 34 (77) | (n = 37) 25 (68) |
| Week 64 | (n = 30) 28 (93) | (n = 27) 22 (81) | (n = 28) 25 (89) | (n = 18) 15 (83) |

*Post hoc analysis

TABLE 5

Patients with a 25%, 50%, and 75% improvement from baseline in pruritus VAS and EASI scores at week 12 and week 64 for intent to treat (ITT) population who received nemolizumab in part A (data are shown as number percentage). Includes data after rescue therapy.

| | | Nemolizumab | | | | | | | |
|---|---|---|---|---|---|---|---|---|---|
| | | 0.1 mg/kg Q4W (n = 53) | | 0.5 mg/k Q4W (n = 54) | | 2.0 mg/kg Q4W (n = 52) | | 2.0 mg/kg Q8W (n = 52) | |
| End point | | Week 12 | Week 64 | Week 12 | Week 64 | Week 12 | Week 64 | Week 12 | Week 64 |
| Pruritus VAS | | (n = 45) | (n = 29) | (n = 45) | (n = 26) | (n = 46) | (n = 28) | (n = 39) | (n = 18) |
| 25% | | 35 (78) | 26 (90) | 38 (84) | 26 (100) | 42 (91) | 26 (93) | 33 (85) | 17 (94) |
| 50% | | 22 (49) | 23 (79) | 32 (71) | 26 (100) | 31 (67) | 22 (79) | 29 (74) | 16 (89) |
| 75% | | 8 (18) | 19 (66) | 24 (53) | 24 (92) | 21 (46) | 19 (68) | 18 (46) | 14 (78) |
| EASI | | (n = 45) | (n = 31) | (n = 46) | (n = 28) | (n = 46) | (n = 29) | (n = 37) | (n = 19) |

TABLE 5-continued

Patients with a 25%, 50%, and 75% improvement from baseline in pruritus VAS and EASI scores at week 12 and week 64 for intent to treat (ITT) population who received nemolizumab in part A (data are shown as number percentage). Includes data after rescue therapy.

| | Nemolizumab | | | | | | | |
|---|---|---|---|---|---|---|---|---|
| | 0.1 mg/kg Q4W (n = 53) | | 0.5 mg/k Q4W (n = 54) | | 2.0 mg/kg Q4W (n = 52) | | 2.0 mg/kg Q8W (n = 52) | |
| End point | Week 12 | Week 64 | Week 12 | Week 64 | Week 12 | Week 64 | Week 12 | Week 64 |
| 25% | 27 (60) | 27 (87) | 32 (70) | 28 (100) | 34 (74) | 27 (93) | 27 (73) | 17 (89) |
| 50% | 21 (47) | 23 (74) | 25 (54) | 20 (71) | 22 (48) | 26 (90) | 16 (43) | 15 (79) |
| 75% | 13 (29) | 21 (68) | 18 (39) | 19 (68) | 11 (24) | 19 (66) | 8 (22) | 14 (74) |

In patients who received placebo in Part A and switched to nemolizumab at week 12, a response to treatment in pruritus VAS score was seen by week 16 (i.e. 4 weeks after switch to active treatment) and maintained through week 64 (1 year after the switch to active treatment, see Table 6 below). Generally, mean±SD percentage change from week 12 baseline to week 16 in SCORAD score, EASI score, BSA affected, and sleep disturbance VAS score indicated improvement that was maintained or increased from week 16 to week 64 (see Table 6). However, these data were affected by outlier values in the small number of patients included in each group, with a high degree of variability seen at each visit (see Table 6).

TABLE 6

Percentage change from baseline (week 12) in secondary and exploratory end points at week 16 (4 weeks after first nemolizumab dose in part B) and week 64 for intent to treat (ITT) population who received placebo in part A (includes data after rescue therapy).

| | Patients rerandomized from placebo to nemolizumab in Part B | | |
|---|---|---|---|
| End point | 0.1 mg/kg Q4W (n = 12) | 0.5 mg/kg Q4W (n = 12) | 2.0 mg/kg Q4W (n = 13) |
| Percentage change in pruritus VAS score, mean ± SD | | | |
| Week 16 | (n = 12)—33.3 ± 35.4 | (n = 12)—39.3 ± 33.1 | (n = 13)—55.5 ± 30.3 |
| Week 64 | (n = 8)—44.7 ± 32.0 | (n = 5)—41.3 ± 64.2 | (n = 6)—47.5 ± 72.7 |
| Percentage change in EASI score, mean ± SD | | | |
| Week 16 | (n = 12)—5.9 ± 45.2 | (n = 12)—27.8 ± 33.6 | (n = 11) 30.4 ± 156.5 |
| Week 64 | (n = 8)—62.7 ± 19.4 | (n = 7) 6.3 ± 171.2 | (n = 7)—52.9 ± 65.2 |
| Percentage change in SCORAD score, mean ± SD | | | |
| Week 16 | (n = 10)—12.3 ± 19.2 | (n = 11)—22.5 ± 25.5 | (n = 11)—21.6 ± 34.4 |
| Week 64 | (n = 6)—40.6 ± 17.9 | (n = 6)—9.3 ± 86.5 | (n = 7)—46.2 ± 60.9 |
| Percentage change in BSA affected by AD, mean ± SD | | | |
| Week 16 | (n = 12) 30.1 ± 134.9 | (n = 12)—6.2 ± 28.1 | (n = 11) 21.4 ± 100.2 |
| Week 64 | (n = 8)—33.0 ± 29.6 | (n = 7)—50.4 ± 59.4 | (n = 7)—64.6 ± 42.0 |
| Percentage change in sleep disturbance VAS, mean ± SD | | | |
| Week 16 | (n = 12)—20.5 ± 41.0 | (n = 12)—46.6 ± 40.1 | (n = 13)—52.5 ± 33.9 |
| Week 64 | (n = 8)—47.2 ± 34.8 | (n = 5) 9.4 ± 162.0 | (n = 6)—72.5 ± 30.4 |
| Proportion of patients with ≥4-point decrease in DLQI score, * no. (%) | | | |
| Week 16 | (n = 12) 6 (50) | (n = 12) 8 (67) | (n = 12) 10 (83) |
| Week 64 | (n = 8) 6 (75) | (n = 7) 8 (86) | (n = 8) 8 (100) |

* Post hoc analysis

In patients randomized to receive nemolizumab throughout the 64-week study period, median duration of topical glucocorticosteroid use was lower with increasing nemolizumab dose at or greater than 0.5 mg/kg, from 27.0 weeks (range, 1-62 weeks) in the 0.1-mg/kg Q4W group to 8.0 weeks (range, 1-57 weeks) and 7.5 weeks (range, 1-59 weeks) in the 0.5- and 2.0-mg/kg Q4W groups, respectively, and 3.0 weeks (range, 1-48 weeks) in the 2.0-mg/kg Q8W group (see Table 7).

patients tended to be lower with increasing dose for patients receiving "potent," "moderately potent," and "weak" agents (see Table 7); available data were limited for "very potent" agents.

The dermatology life quality index (DLQI) total score decreased progressively throughout the study in patients randomized to nemolizumab Q4W and Q8W throughout the 64-week period, with a greater proportion of patients demonstrating a 4-point or greater decrease in total score at week 64 versus week 12 (FIG. 7, and Table 4). A similar trend was observed in patients who had received placebo in part A (see Table 6).

Overall, no new safety concerns were identified after long-term use of nemolizumab. In patients randomized to receive nemolizumab throughout the study period (64 weeks), a similar proportion had at least 1 AE (83% to 89% of patients) or at least 1 treatment-related AE (37% to 48%) over the course of the study (see Table 8 below). The most common AEs in these patients (≥5% of patients randomized to nemolizumab throughout the study period) were nasopharyngitis (27%), exacerbation of AD (25%), increased blood creatine phosphokinase (11%), upper respiratory tract infection (9%), headache (8%), peripheral edema (6%), and impetigo (6%). The most common treatment-related AEs (≥2% patients randomized to nemolizumab throughout the study period) were exacerbation of AD (8%), upper respiratory tract infection (4%), nasopharyngitis (4%), peripheral edema (3%), increased blood creatine phosphokinase level (3%), and injection-site reaction (2%). All treatment-related AEs, except nasopharyngitis and injection-site reactions, occurred at a slightly higher incidence in the 2.0-mg/kg

TABLE 7

Duration of use and cumulative dose of topical glucocorticosteroids throughout the study period from baseline (*) to endo treatment overall and by potency (*) in the intent to treat population who received nemolizumab in part A (data is shown as median ranges).

| Topical glucocorticosteroid use† | Nemolizumab | | | |
|---|---|---|---|---|
| | 0.1 mg/kg Q4W (n = 53) | 0.5 mg/kg Q4W (n = 54) | 2.0 mg/kg Q4W (n = 52) | 2.0 mg/kg Q8W (n = 52) |
| Overall | (n = 18) | (n = 17) | (n = 20) | (n = 11) |
| Duration of use (wk) | 27.0 (1-62) | 8.0 (1-57) | 7.5 (1-59) | 3.0 (1-48) |
| Cumulative amount used (g) | 137.4 (2-2,245) | 60.7 (2-822) | 55.8 (1-1,174) | 44.7 (10-250) |
| By potency | | | | |
| Very potent | (n = 1) | (n = 2) | (n = 0) | (n = 0) |
| Duration of use (wk) | 1.0 | 40.0 (40-40) | | |
| Cumulative amount used (g) | 1.9 | 129.1 (60-198) | | |
| Potent | (n = 13) | (n = 9) | (n = 12) | (n = 7) |
| Duration of use (wk) | 14.0 (2-62) | 4.0 (1-23) | 5.5 (1-24) | 3.0 (1-4) |
| Cumulative amount used (g) | 72.0 (24-1,015) | 19.2 (2-38) | 21.2 (1-166) | 32.8 (12-200) |
| Moderately potent | (n = 9) | (n = 8) | (n = 6) | (n = 4) |
| Duration of use (wk) | 24.0 (3-62) | 6.0 (2-51) | 6.0 (1-59) | 2.5 (2-4) |
| Cumulative amount used (g) | 70.2 (3-214) | 63.2 (6-586) | 50.7 (2-1,174) | 7.1 (2-39) |
| Weak | (n = 3) | (n = 5) | (n = 4) | (n = 4) |
| Duration of use (wk) | 28.0 (21-52) | 23.0 (1-36) | 9.0 (4-13) | 3.5 (1-9) |
| Cumulative amount used (g) | 581.0 (96-620) | 41.5 (6-635) | 108.1 (18-271) | 11.6 (2-80) |
| Unknown | (n = 4) | (n = 5) | (n = 2) | (n = 3) |
| Duration of use (wk) | 22.5 (3-52) | 8.0 (3-52) | 50.5 (49-52) | 29.0 (4-48) |
| Cumulative amount used (g) | 87.4 (33-2,218) | 9.5 (2-320) | 415.8 (89-743) | 100.0 (45-105) |

†Potency of topical glucocorticosteroids, as defined by the National Institute for Health and Care Excellence (see Atopic eczema in children. Management of atopic eczema in children from birth up to the age of 12 years. Clinical guideline. 2007.
* Baseline values are unavailable (zero) because patients were not permitted to use potent or very potent topical glucocorticosteroids within 2 weeks before randomization or mild or moderately potent topical glucocorticosteroids within 1 week before randomization. Use of topical glucocorticosteroids was not permitted during part A of the study, except as a rescue therapy at or after week 4.

Median cumulative dose of topical glucocorticosteroid therapy was also lower with increasing nemolizumab dose at or greater than 0.5 mg/kg, from 137.4 g (range, 2-2,245 g) in the 0.1-mg/kg Q4W group to 60.7 g (range, 2-822 g), 55.8 g (range, 1-1,174 g), and 44.7 g (range, 10-250 g) in the 0.5- and 2.0-mg/kg Q4W and 2.0-mg/kg Q8W groups, respectively (see Table 7). However, there was a high degree of variation between patients for duration and dose of topical glucocorticosteroid therapy, and the number of evaluable patients within the total number of patients receiving glucocorticosteroid therapy was limited (18/30, 17/24, and 20/27 in the 0.1-, 0.5-, and 2.0-mg/kg Q4W groups, respectively, and 11/24 in the 2.0-mg/kg Q8W group). The proportion of patients receiving "very potent" topical glucocorticosteroids was similar among groups, whereas the proportion of patients receiving "potent" agents was greatest in the lowest nemolizumab Q4W group (63% [19/30] in the 0.1-mg/kg group, 42% [10/24] in the 0.5-mg/kg group, and 56% [15/27] in the 2.0-mg/kg group). Duration of use and cumulative dose of topical glucocorticosteroids in evaluable Q4W group than in the other study groups. The proportion of patients randomized to receive nemolizumab throughout the 64-week study period who experienced new-onset AEs decreased over time, with the majority of AEs reported in the first 12 weeks of the study (see Table 9 below). The majority of AEs during the study were mild or moderate in intensity. SAEs occurred in 9 (17%) patients receiving 2.0 mg/kg nemolizumab Q8W versus 3 to 4 (6% to 8%) patients across the Q4W treatment groups (see Table 8). Six SAEs reported in 5 patients were considered related to study therapy. Five patients (1 in the 0.5-mg/kg Q4W group, 2 in the 2.0-mg/kg Q4W group, and 2 in the 2.0-mg/kg Q8W group) had 1 SAE of exacerbation of AD, which was considered treatment related in 1 patient.

TABLE 8

Adverse events (AEs) over the total 64-week study period in patients randomized to nemolizumab throughout the study period.

|  | Placebo* (n = 53) | Nemolizumab | | | |
|---|---|---|---|---|---|
|  |  | 0.1 mg/kg Q4W (n = 53) | 0.5 mg/kg Q4W (n = 54) | 2.0 mg/kg Q4W (n = 52) | 2.0 mg/kg Q8W (n = 52) |
| Total exposure period (patient-years) | 11.4 | 45.6 | 42.4 | 45.1 | 35.0 |
| AEs |  |  |  |  |  |
| Patients with ≥1 AE, no. | 36 | 47 | 45 | 45 | 42 |
| Total no. of AEs, no. | 105 | 208 | 193 | 211 | 172 |
| Event/100 patient-years | 924.1 | 455.9 | 455.1 | 468.3 | 491.3 |
| Nasopharyngitis | 70 | 70 | 68 | 49 | 60 |
| Exacerbation of AD | 70 | 42 | 35 | 36 | 34 |
| Increased blood creatine phosphokinase | 26 | 11 | 14 | 31 | 11 |
| Upper RTI | 62 | 18 | 19 | 20 | 14 |
| Headache | — | 13 | 21 | 11 | 9 |
| Peripheral edema | — | 7 | 7 | 18 | 9 |
| Impetigo | — | 13 | 7 | — | 9 |
| SAEs |  |  |  |  |  |
| Patients with ≥1 SAE, no. | 1 | 2 | 2 | 4 | 8 |
| Total no. of SAEs | 1 | 2 | 2 | 6 | 10 |
| Event/100 patient-years | 8.8 | 4.4 | 4.7 | 13.3 | 28.6 |

*Patients who received placebo during part A

The proportion of patients experiencing new-onset SAEs was distributed evenly over the study duration (see Table 9 below). After adjustment for drug exposure, rates of AEs and SAEs in patients randomized to nemolizumab for the 64-week study period were higher in the 2.0-mg/kg Q8W group than the 0.1-, 0.5-, and 2.0-mg/kg Q4W groups (Table 10); however, no increase in specific AEs was observed. Discontinuation of study therapy because of AEs in patients randomized to receive nemolizumab throughout the 64-week study period occurred in 7 (13%), 3 (6%), 5 (10%), and 6 (12%) patients in the nemolizumab 0.1-, 0.5-, and 2.0-mg/kg Q4W and 2.0-mg/kg Q8W groups, respectively (see Table 11). Ten patients, all in Part A, discontinued the study prematurely because of exacerbation of AD.

TABLE 9

New onset adverse events (AEs) and severe adverse events (SAEs) by time period in patients randomized to receive nemolizumab throughout the study period (safety population).

|  | Period | | | | | | |
|---|---|---|---|---|---|---|---|
|  | Any period | 0-12 wk | >12-24 wk | >24-36 wk | >36-48 wk | >48-64 wk | Follow-up |
| AEs |  |  |  |  |  |  |  |
| Nemolizumab, 0.1 mg/kg Q4W |  |  |  |  |  |  |  |
| No. of patients | 53 | 53 | 41 | 38 | 33 | 32 | 51 |
| Patients with any AE, no. (%) | 47 (89) | 37 (70) | 6 (15) | 3 (8) | 1 (3) | — | — |
| Nemolizumab, 0.5 mg/kg Q4W |  |  |  |  |  |  |  |
| No. of patients | 54 | 54 | 38 | 34 | 30 | 30 | 49 |
| Patients with any AE, no. (%) | 46 (85) | 37 (69) | 5 (13) | 1 (3) | — | 2 (7) | 1 (2) |
| Nemolizumab, 2.0 mg/kg Q4W |  |  |  |  |  |  |  |
| No. of patients | 52 | 52 | 39 | 36 | 33 | 32 | 49 |
| Patients with any AE, no. (%) | 45 (87) | 39 (75) | 2 (5) | 1 (3) | 2 (6) | — | — |
| Nemolizumab, 2.0 mg/kg Q8W |  |  |  |  |  |  |  |
| No. of patients | 52 | 52 | 35 | 30 | 25 | 20 | 43 |
| Patients with any AE, no. (%) | 43 (83) | 38 (73) | 1 (3) | 3 (10) | — | — | 1 (2) |

TABLE 9-continued

New onset adverse events (AEs) and severe adverse events (SAEs) by time period in patients randomized to receive nemolizumab throughout the study period (safety population).

| | Period | | | | | | |
|---|---|---|---|---|---|---|---|
| | Any period | 0-12 wk | >12-24 wk | >24-36 wk | >36-48 wk | >48-64 wk | Follow-up |
| SAEs Nemolizumab, 0.1 mg/kg Q4W | | | | | | | |
| No. of patients | 53 | 53 | 41 | 38 | 33 | 32 | 51 |
| Patients with any SAE, no. (%) | 3 (6) | 1 (2) | — | — | 1 (3) | — | 1 (2) |
| Nemolizumab, 0.5 mg/kg Q4W | | | | | | | |
| No. of patients | 54 | 54 | 38 | 34 | 30 | 30 | 49 |
| Patients with any SAE, no. (%) | 3 (6) | — | — | — | — | 2 (7) | 1 (2) |
| Nemolizumab, 2.0 mg/kg Q4W | | | | | | | |
| No. of patients | 52 | 52 | 39 | 36 | 33 | 32 | 49 |
| Patients with any SAE, no. (%) | 4 (8) | 3 (6) | 1 (3) | — | — | — | — |
| Nemolizumab, 2.0 mg/kg Q8W | | | | | | | |
| No. of patients | 52 | 52 | 35 | 30 | 25 | 20 | 43 |
| Patients with any SAE, no. (%) | 9 (17) | 4 (8) | 2 (6) | 1 (3) | 1 (4) | 1 (5) | 1 (2) |

TABLE 10

Exposure-adjusted adverse events (AEs) represented as the number of events per 100 patient-years based on the ration of observed number of events to total number of patient-years of exposure.

| | Placebo† (n = 53) | Nemolizumab* | | | |
|---|---|---|---|---|---|
| | | 0.1 mg/kg Q4W (n = 53) | 0.5 mg/kg Q4W (n = 54) | 2.0 mg/kg Q4W (n = 52) | 2.0 mg/kg Q8W (n = 52) |
| Total exposure period (patient-years) | 11.4 | 45.6 | 42.4 | 45.1 | 35.0 |
| AEs | | | | | |
| Patients with ≥1 AE, no. | 36 | 47 | 45 | 45 | 42 |
| Total no. of AEs, no. | 105 | 208 | 193 | 211 | 172 |
| Event/100 patient-years | 924.1 | 455.9 | 455.1 | 468.3 | 491.3 |
| Nasopharyngitis | 70 | 70 | 68 | 49 | 60 |
| Exacerbation of AD | 70 | 42 | 35 | 36 | 34 |
| Increased blood creatine phosphokinase | 26 | 11 | 14 | 31 | 11 |
| Upper RTI | 62 | 18 | 19 | 20 | 14 |
| Headache | — | 13 | 21 | 11 | 9 |
| Peripheral edema | — | 7 | 7 | 18 | 9 |
| Impetigo | — | 13 | 7 | — | 9 |
| SAEs | | | | | |
| Patients with ≥1 SAE, no. | 1 | 2 | 2 | 4 | 8 |
| Total no. of SAEs | 1 | 2 | 2 | 6 | 10 |
| Event/100 patient-years | 8.8 | 4.4 | 4.7 | 13.3 | 28.6 |

*Patients who received nemoliztunab during part A and part B.
†Patients who received placebo during part A.

TABLE 11

Adverse events (AEs) leading to withdrawal from treatment in patients with randomized to nemolizumab throughout the study period.

| | Nemolizumab | | | |
|---|---|---|---|---|
| Event | 0.1 mg/kg Q4W (n = 53) | 0.5 mg/kg Q4W (n = 54) | 2.0 mg/kg Q4W (n = 52) | 2.0 mg/kg Q8W (n = 52) |
| Patients with AEs leading to withdrawal from treatment, no. (%) | 7 (13) | 3 (6) | 5 (10) | 6 (12)* |
| Total no. of events | 7 | 5 | 8 | 7 |
| Exacerbation of AD | 2 | 3 | 3 | 2 |
| Impetigo | 1 | 0 | 0 | 1 |
| Kaposi variceliform eruption | 1 | 0 | 0 | 1 |
| Lymphadenopathy | 1 | 0 | 1 | 0 |
| Skin infection | 0 | 1 | 1 | 0 |
| Asthma | 1 | 0 | 0 | 0 |

TABLE 11-continued

Adverse events (AEs) leading to withdrawal from treatment in patients with randomized to nemolizumab throughout the study period.

| Event | Nemolizumab | | | |
|---|---|---|---|---|
| | 0.1 mg/kg Q4W (n = 53) | 0.5 mg/kg Q4W (n = 54) | 2.0 mg/kg Q4W (n = 52) | 2.0 mg/kg Q8W (n = 52) |
| Atopic keratoconjunctivitis | 0 | 0 | 1 | 0 |
| Dermal cyst | 1 | 0 | 0 | 0 |
| Dermatitis exfoliative | 0 | 0 | 0 | 1 |
| Erysipelas | 0 | 0 | 1 | 0 |
| Grand mal convulsion | 0 | 0 | 0 | 1 |
| Palindromic rheumatism | 0 | 0 | 1 | 0 |
| Restlessness | 0 | 1 | 0 | 0 |
| Sinus tachycardia | 0 | 0 | 0 | 1 |

*One patient withdrew from the study because of an AE after the last study drug injection and is not listed.

In patients re-randomized from placebo to nemolizumab in part B, AEs were reported in 67% to 92% of patients across treatment groups (see Table 12). The most frequent AEs were similar to those seen during the study as a whole (see Table 12). One SAE was reported in 1 patient who had received placebo during part A. Two patients who received placebo during part A discontinued treatment because of AEs after randomization to nemolizumab in part B. The majority of injection-related reactions (IRRs) occurred during part A of the study, with no trend of a dose-related effect (12 patients had 13 events in part A and 4 patients had 5 events in part B). Almost all IRRs were local reactions, predominantly mild in severity, and were mostly considered treatment related. One IRR resulted in discontinuation of study treatment (dermatitis exfoliative).

TABLE 12

Adverse events (AEs) in part B patients randomized to receive placebo in part A (safety population).

| Event | Patients rerandomized from placebo to nemolizumab in part B | | |
|---|---|---|---|
| | 0.1 mg/kg Q4W (n = 13) | 0.5 mg/kg Q4W (n = 12) | 2.0 mg/kg Q4W (n = 13) |
| Total no. of AEs | 37 | 27 | 57 |
| Patients with ≥1 AE, no. (%) | 9 (69) | 8 (67) | 12 (92) |
| Related to study treatment, no. (%) | 4 (31) | 1 (8) | 4 (31) |
| Patients with ≥1 SAE, no. (%) | 0 | 0 | 1 (8)* |
| Related to study treatment, no. (%) | 0 | 0 | 1 (8) |
| Patients with AEs leading to withdrawal from treatment, no. (%) | 1 (8)† | 0 | 1 (8)‡ |
| Related to study treatment, no. (%) | 1 (8) | 0 | 1 (8) |
| AEs in ≥2 patients, no. (%) | | | |
| Nasopharyngitis | 2 (15) | 3 (25) | 4 (31) |
| Exacerbation of AD | 2 (15) | 3 (25) | 1 (8) |
| Increased blood creatine phosphokinase | 2 (15) | 1 (8) | 2 (15) |
| Headache | 2 (15) | 1 (8) | 1 (8) |
| Abdominal pain | 1 (8) | 0 | 1 (8) |
| Asthma | 1 (8) | 1 (8) | 0 |
| Back pain | 0 | 1 (8) | 1 (8) |
| Contact dermatitis | 1 (8) | 0 | 1 (8) |
| Contusion | 0 | 0 | 2 (15) |
| Cough | 1 (8) | 0 | 1 (8) |
| Eyelid edema | 1 (8) | 0 | 1 (8) |
| Herpes zoster | 0 | 0 | 2 (15) |
| Impetigo | 1 (8) | 1 (8) | 0 |
| Otitis externa | 0 | 2 (17) | 0 |
| Peripheral edema | 0 | 0 | 2 (15) |

*SAE of diverticulitis,
†Asthma,
‡Bronchial hyperreactivity

Discussion

This study evaluated the efficacy and tolerability of nemolizumab, an anti-IL-31 receptor A mAb, for the treatment of patients with AD inadequately controlled by topical therapy. The study demonstrated that improvements in pruritus, dermatitis, and sleep measures versus placebo in the 12-week placebo-controlled portion of the study (Part A) were maintained or progressively increased with long-term treatment for up to 64 weeks (extension phase: Part B). In keeping with results from Part A, although the study was not designed to compare formally the different dose groups, there was no evidence that 2.0 mg/kg nemolizumab administered Q4W or Q8W was more effective than the 0.5-mg/kg dose. In part B patients were allowed to use mild topical glucocorticosteroids, with potent or very potent topical glucocorticosteroids permitted as rescue therapy. Over the course of the study, the duration and cumulative dose of concomitant topical glucocorticosteroid therapy was lower in patients receiving higher (≥0.5 mg/kg) doses of nemolizumab; however, limited patient numbers preclude any conclusions. These findings propose that the absence of a dose-dependent response, which would have resulted in increased efficacy with higher doses of nemolizumab, might have been affected by the greater use of topical glucocorticosteroid therapy in patients in the 0.1-mg/kg group.

AD and the accompanying pruritus impairs quality of life (QoL) in patients with the disease. The reduction in dermatology life quality index (DLQI) scores observed during Part A of the study were maintained throughout the long-term extension, suggesting prolonged alleviation of the effect of symptoms on daily life. These findings are consistent with the early improvement in pruritus observed within week 1 of nemolizumab treatment in Part A of the study.

Overall, nemolizumab was well tolerated over 64 weeks. The safety profile was comparable with that seen in Part A, with no new AEs observed in the extension study. The incidence of IRRs was lower in Part B, suggesting that tolerability to nemolizumab injections improved over time.

In summary, nemolizumab was efficacious and overall well-tolerated when administered for up to 64 weeks in patients with moderate-to-severe AD that is inadequately controlled by previous topical therapy. Treatment with nemolizumab resulted in clinically meaningful reductions in pruritus and dermatitis. No new safety concerns were identified with long-term nemolizumab use.

What is claimed is:

1. A method of selectively treating atopic dermatitis in a subject having one or more moderate to severe skin excoriations, the method comprising subcutaneously administering 30 mg or 60 mg of nemolizumab to the subject once every two weeks or once every four weeks, wherein the one or more moderate to severe skin excoriations have a score of at least 2 on the SCORAD scale.

2. The method of claim 1, wherein the skin excoriations are moderate.

3. The method of claim 1, wherein the nemolizumab is administered once every two weeks.

4. The method of claim 1, wherein the skin excoriations are severe.

5. The method of claim 1, wherein the nemolizumab is administered once every four weeks.

6. A method of selecting a subject having atopic dermatitis for treatment with nemolizumab, the method comprising detecting one or more excoriations of the subject's skin, scoring the excoriations as mild, moderate, or severe, and selecting the subject for treatment with 30 mg or 60 mg of nemolizumab if one or more excoriations are detected that are moderate to severe, wherein scoring the excoriations as mild, moderate, or severe comprises scoring the excoriations as 1, 2, or 3 according to the SCORAD scale, and administering 30 mg or 60 mg of nemolizumab to the subject once every four weeks.

7. The method of claim 6, wherein the nemolizumab is administered by a topical or parenteral route.

8. The method of claim 6, wherein the nemolizumab is administered subcutaneously.

9. A method for treating a patient having atopic dermatitis, the method comprising:
    (a) screening the patient having atopic dermatitis for one or more skin excoriations;
    (b) selecting the patient for treatment if the patient has one or more excoriations that are moderate to severe, wherein the one or more moderate to severe skin excoriations have a score of at least 2 on the SCORAD scale; and
    (c) treating the patient with one or more excoriations that are moderate to severe by subcutaneously administering to the patient 30 mg or 60 mg of nemolizumab once every two weeks or once every four weeks.

10. The method of claim 9, wherein the skin excoriations are moderate.

11. The method of claim 9, wherein the effective amount of nemolizumab is administered once every two weeks.

12. The method of claim 9, wherein the skin excoriations are severe.

13. The method of claim 9, wherein the nemolizumab is administered once every four weeks.

14. A method of treating atopic dermatitis in a subject having one or more moderate to severe skin excoriations, the method comprising subcutaneously administering 30 mg or 60 mg of nemolizumab to the subject once every four weeks, wherein the one or more moderate to severe skin excoriations have a score of at least 2 on the SCORAD scale.

* * * * *

SEQUENCE LISTING

<160> NUMBER OF SEQ ID NOS: 6

<210> SEQ ID NO 1
<211> LENGTH: 662
<212> TYPE: PRT
<213> ORGANISM: Homo sapiens

<400> SEQUENCE: 1

```
Met Lys Leu Ser Pro Gln Pro Ser Cys Val Asn Leu Gly Met Met Trp
 1               5                  10                  15

Thr Trp Ala Leu Trp Met Leu Pro Ser Leu Cys Lys Phe Ser Leu Ala
             20                  25                  30

Ala Leu Pro Ala Lys Pro Glu Asn Ile Ser Cys Val Tyr Tyr Tyr Arg
         35                  40                  45

Lys Asn Leu Thr Cys Thr Trp Ser Pro Gly Lys Glu Thr Ser Tyr Thr
     50                  55                  60

Gln Tyr Thr Val Lys Arg Thr Tyr Ala Phe Gly Glu Lys His Asp Asn
 65                  70                  75                  80

Cys Thr Thr Asn Ser Ser Thr Ser Glu Asn Arg Ala Ser Cys Ser Phe
                 85                  90                  95

Phe Leu Pro Arg Ile Thr Ile Pro Asp Asn Tyr Thr Ile Glu Val Glu
            100                 105                 110

Ala Glu Asn Gly Asp Gly Val Ile Lys Ser His Met Thr Tyr Trp Arg
        115                 120                 125

Leu Glu Asn Ile Ala Lys Thr Glu Pro Pro Lys Ile Phe Arg Val Lys
    130                 135                 140

Pro Val Leu Gly Ile Lys Arg Met Ile Gln Ile Glu Trp Ile Lys Pro
145                 150                 155                 160

Glu Leu Ala Pro Val Ser Ser Asp Leu Lys Tyr Thr Leu Arg Phe Arg
                165                 170                 175

Thr Val Asn Ser Thr Ser Trp Met Glu Val Asn Phe Ala Lys Asn Arg
            180                 185                 190

Lys Asp Lys Asn Gln Thr Tyr Asn Leu Thr Gly Leu Gln Pro Phe Thr
        195                 200                 205

Glu Tyr Val Ile Ala Leu Arg Cys Ala Val Lys Glu Ser Lys Phe Trp
    210                 215                 220

Ser Asp Trp Ser Gln Glu Lys Met Gly Met Thr Glu Glu Glu Ala Pro
225                 230                 235                 240

Cys Gly Leu Glu Leu Trp Arg Val Leu Lys Pro Ala Glu Ala Asp Gly
                245                 250                 255

Arg Arg Pro Val Arg Leu Leu Trp Lys Lys Ala Arg Gly Ala Pro Val
            260                 265                 270

Leu Glu Lys Thr Leu Gly Tyr Asn Ile Trp Tyr Tyr Pro Glu Ser Asn
        275                 280                 285

Thr Asn Leu Thr Glu Thr Met Asn Thr Asn Gln Gln Leu Glu Leu
    290                 295                 300

His Leu Gly Gly Glu Ser Phe Trp Val Ser Met Ile Ser Tyr Asn Ser
305                 310                 315                 320

Leu Gly Lys Ser Pro Val Ala Thr Leu Arg Ile Pro Ala Ile Gln Glu
                325                 330                 335

Lys Ser Phe Gln Cys Ile Glu Val Met Gln Ala Cys Val Ala Glu Asp
            340                 345                 350

Gln Leu Val Val Lys Trp Gln Ser Ser Ala Leu Asp Val Asn Thr Trp
        355                 360                 365
```

```
Met Ile Glu Trp Phe Pro Asp Val Asp Ser Glu Pro Thr Thr Leu Ser
    370                 375                 380

Trp Glu Ser Val Ser Gln Ala Thr Asn Trp Thr Ile Gln Gln Asp Lys
385                 390                 395                 400

Leu Lys Pro Phe Trp Cys Tyr Asn Ile Ser Val Tyr Pro Met Leu His
                405                 410                 415

Asp Lys Val Gly Glu Pro Tyr Ser Ile Gln Ala Tyr Ala Lys Glu Gly
            420                 425                 430

Val Pro Ser Glu Gly Pro Glu Thr Lys Val Glu Asn Ile Gly Val Lys
        435                 440                 445

Thr Val Thr Ile Thr Trp Lys Glu Ile Pro Lys Ser Glu Arg Lys Gly
    450                 455                 460

Ile Ile Cys Asn Tyr Thr Ile Phe Tyr Gln Ala Glu Gly Gly Lys Gly
465                 470                 475                 480

Phe Ser Lys Thr Val Asn Ser Ser Ile Leu Gln Tyr Gly Leu Glu Ser
                485                 490                 495

Leu Lys Arg Lys Thr Ser Tyr Ile Val Gln Val Met Ala Ser Thr Ser
            500                 505                 510

Ala Gly Gly Thr Asn Gly Thr Ser Ile Asn Phe Lys Thr Leu Ser Phe
        515                 520                 525

Ser Val Phe Glu Ile Ile Leu Ile Thr Ser Leu Ile Gly Gly Gly Leu
    530                 535                 540

Leu Ile Leu Ile Ile Leu Thr Val Ala Tyr Gly Leu Lys Lys Pro Asn
545                 550                 555                 560

Lys Leu Thr His Leu Cys Trp Pro Thr Val Pro Asn Pro Ala Glu Ser
                565                 570                 575

Ser Ile Ala Thr Trp His Gly Asp Asp Phe Lys Asp Lys Leu Asn Leu
            580                 585                 590

Lys Glu Ser Asp Asp Ser Val Asn Thr Glu Asp Arg Ile Leu Lys Pro
        595                 600                 605

Cys Ser Thr Pro Ser Asp Lys Leu Val Ile Asp Lys Leu Val Val Asn
    610                 615                 620

Phe Gly Asn Val Leu Gln Glu Ile Phe Thr Asp Glu Ala Arg Thr Gly
625                 630                 635                 640

Gln Glu Asn Asn Leu Gly Gly Glu Lys Asn Gly Thr Arg Ile Leu Ser
                645                 650                 655

Ser Cys Pro Thr Ser Ile
            660

<210> SEQ ID NO 2
<211> LENGTH: 732
<212> TYPE: PRT
<213> ORGANISM: Homo sapiens

<400> SEQUENCE: 2

Met Met Trp Thr Trp Ala Leu Trp Met Leu Pro Ser Leu Cys Lys Phe
1               5                   10                  15

Ser Leu Ala Ala Leu Pro Ala Lys Pro Glu Asn Ile Ser Cys Val Tyr
                20                  25                  30

Tyr Tyr Arg Lys Asn Leu Thr Cys Thr Trp Ser Pro Gly Lys Glu Thr
            35                  40                  45

Ser Tyr Thr Gln Tyr Thr Val Lys Arg Thr Tyr Ala Phe Gly Glu Lys
        50                  55                  60

His Asp Asn Cys Thr Thr Asn Ser Ser Thr Ser Glu Asn Arg Ala Ser
65                  70                  75                  80
```

```
Cys Ser Phe Phe Leu Pro Arg Ile Thr Ile Pro Asp Asn Tyr Thr Ile
                 85                  90                  95
Glu Val Glu Ala Glu Asn Gly Asp Gly Val Ile Lys Ser His Met Thr
                100                 105                 110
Tyr Trp Arg Leu Glu Asn Ile Ala Lys Thr Glu Pro Pro Lys Ile Phe
                115                 120                 125
Arg Val Lys Pro Val Leu Gly Ile Lys Arg Met Ile Gln Ile Glu Trp
                130                 135                 140
Ile Lys Pro Glu Leu Ala Pro Val Ser Ser Asp Leu Lys Tyr Thr Leu
145                 150                 155                 160
Arg Phe Arg Thr Val Asn Ser Thr Ser Trp Met Glu Val Asn Phe Ala
                165                 170                 175
Lys Asn Arg Lys Asp Lys Asn Gln Thr Tyr Asn Leu Thr Gly Leu Gln
                180                 185                 190
Pro Phe Thr Glu Tyr Val Ile Ala Leu Arg Cys Ala Val Lys Glu Ser
                195                 200                 205
Lys Phe Trp Ser Asp Trp Ser Gln Glu Lys Met Gly Met Thr Glu Glu
                210                 215                 220
Glu Ala Pro Cys Gly Leu Glu Leu Trp Arg Val Leu Lys Pro Ala Glu
225                 230                 235                 240
Ala Asp Gly Arg Arg Pro Val Arg Leu Leu Trp Lys Lys Ala Arg Gly
                245                 250                 255
Ala Pro Val Leu Glu Lys Thr Leu Gly Tyr Asn Ile Trp Tyr Tyr Pro
                260                 265                 270
Glu Ser Asn Thr Asn Leu Thr Glu Thr Met Asn Thr Thr Asn Gln Gln
                275                 280                 285
Leu Glu Leu His Leu Gly Gly Glu Ser Phe Trp Val Ser Met Ile Ser
290                 295                 300
Tyr Asn Ser Leu Gly Lys Ser Pro Val Ala Thr Leu Arg Ile Pro Ala
305                 310                 315                 320
Ile Gln Glu Lys Ser Phe Gln Cys Ile Glu Val Met Gln Ala Cys Val
                325                 330                 335
Ala Glu Asp Gln Leu Val Val Lys Trp Gln Ser Ser Ala Leu Asp Val
                340                 345                 350
Asn Thr Trp Met Ile Glu Trp Phe Pro Asp Val Asp Ser Glu Pro Thr
                355                 360                 365
Thr Leu Ser Trp Glu Ser Val Ser Gln Ala Thr Asn Trp Thr Ile Gln
    370                 375                 380
Gln Asp Lys Leu Lys Pro Phe Trp Cys Tyr Asn Ile Ser Val Tyr Pro
385                 390                 395                 400
Met Leu His Asp Lys Val Gly Glu Pro Tyr Ser Ile Gln Ala Tyr Ala
                405                 410                 415
Lys Glu Gly Val Pro Ser Glu Gly Pro Glu Thr Lys Val Glu Asn Ile
                420                 425                 430
Gly Val Lys Thr Val Thr Ile Thr Trp Lys Glu Ile Pro Lys Ser Glu
                435                 440                 445
Arg Lys Gly Ile Ile Cys Asn Tyr Thr Ile Phe Tyr Gln Ala Glu Gly
                450                 455                 460
Gly Lys Gly Phe Ser Lys Thr Val Asn Ser Ser Ile Leu Gln Tyr Gly
465                 470                 475                 480
Leu Glu Ser Leu Lys Arg Lys Thr Ser Tyr Ile Val Gln Val Met Ala
                485                 490                 495
```

```
Ser Thr Ser Ala Gly Gly Thr Asn Gly Thr Ser Ile Asn Phe Lys Thr
            500                 505                 510

Leu Ser Phe Ser Val Phe Glu Ile Ile Leu Ile Thr Ser Leu Ile Gly
        515                 520                 525

Gly Gly Leu Leu Ile Leu Ile Ile Leu Thr Val Ala Tyr Gly Leu Lys
    530                 535                 540

Lys Pro Asn Lys Leu Thr His Leu Cys Trp Pro Thr Val Pro Asn Pro
545                 550                 555                 560

Ala Glu Ser Ser Ile Ala Thr Trp His Gly Asp Asp Phe Lys Asp Lys
                565                 570                 575

Leu Asn Leu Lys Glu Ser Asp Asp Ser Val Asn Thr Glu Asp Arg Ile
            580                 585                 590

Leu Lys Pro Cys Ser Thr Pro Ser Asp Lys Leu Val Ile Asp Lys Leu
        595                 600                 605

Val Val Asn Phe Gly Asn Val Leu Gln Glu Ile Phe Thr Asp Glu Ala
    610                 615                 620

Arg Thr Gly Gln Glu Asn Asn Leu Gly Gly Lys Asn Gly Tyr Val
625                 630                 635                 640

Thr Cys Pro Phe Arg Pro Asp Cys Pro Leu Gly Lys Ser Phe Glu Glu
                645                 650                 655

Leu Pro Val Ser Pro Glu Ile Pro Pro Arg Lys Ser Gln Tyr Leu Arg
            660                 665                 670

Ser Arg Met Pro Glu Gly Thr Arg Pro Glu Ala Lys Glu Gln Leu Leu
        675                 680                 685

Phe Ser Gly Gln Ser Leu Val Pro Asp His Leu Cys Glu Glu Gly Ala
    690                 695                 700

Pro Asn Pro Tyr Leu Lys Asn Ser Val Thr Ala Arg Glu Phe Leu Val
705                 710                 715                 720

Ser Glu Lys Leu Pro Glu His Thr Lys Gly Glu Val
                725                 730

<210> SEQ ID NO 3
<211> LENGTH: 716
<212> TYPE: PRT
<213> ORGANISM: Mus musculus

<400> SEQUENCE: 3

Met Trp Thr Leu Ala Leu Trp Ala Phe Ser Phe Leu Cys Lys Phe Ser
1               5                   10                  15

Leu Ala Val Leu Pro Thr Lys Pro Glu Asn Ile Ser Cys Val Phe Tyr
            20                  25                  30

Phe Asp Arg Asn Leu Thr Cys Thr Trp Arg Pro Glu Lys Glu Thr Asn
        35                  40                  45

Asp Thr Ser Tyr Ile Val Thr Leu Thr Tyr Ser Tyr Gly Lys Ser Asn
    50                  55                  60

Tyr Ser Asp Asn Ala Thr Glu Ala Ser Tyr Ser Phe Pro Arg Ser Cys
65                  70                  75                  80

Ala Met Pro Pro Asp Ile Cys Ser Val Glu Val Gln Ala Gln Asn Gly
                85                  90                  95

Asp Gly Lys Val Lys Ser Asp Ile Thr Tyr Trp His Leu Ile Ser Ile
            100                 105                 110

Ala Lys Thr Glu Pro Pro Ile Ile Leu Ser Val Asn Pro Ile Cys Asn
        115                 120                 125

Arg Met Phe Gln Ile Gln Trp Lys Pro Arg Glu Lys Thr Arg Gly Phe
    130                 135                 140
```

```
Pro Leu Val Cys Met Leu Arg Phe Arg Thr Val Asn Ser Ser Arg Trp
145                 150                 155                 160

Thr Glu Val Asn Phe Glu Asn Cys Lys Gln Val Cys Asn Leu Thr Gly
            165                 170                 175

Leu Gln Ala Phe Thr Glu Tyr Val Leu Ala Leu Arg Phe Arg Phe Asn
        180                 185                 190

Asp Ser Arg Tyr Trp Ser Lys Trp Ser Lys Glu Glu Thr Arg Val Thr
    195                 200                 205

Met Glu Glu Val Pro His Val Leu Asp Leu Trp Arg Ile Leu Glu Pro
210                 215                 220

Ala Asp Met Asn Gly Asp Arg Lys Val Arg Leu Leu Trp Lys Lys Ala
225                 230                 235                 240

Arg Gly Ala Pro Val Leu Glu Lys Thr Phe Gly Tyr His Ile Gln Tyr
                245                 250                 255

Phe Ala Glu Asn Ser Thr Asn Leu Thr Glu Ile Asn Asn Ile Thr Thr
            260                 265                 270

Gln Gln Tyr Glu Leu Leu Met Ser Gln Ala His Ser Val Ser Val
        275                 280                 285

Thr Ser Phe Asn Ser Leu Gly Lys Ser Gln Glu Ala Ile Leu Arg Ile
    290                 295                 300

Pro Asp Val His Glu Lys Thr Phe Gln Tyr Ile Lys Ser Met Lys Ala
305                 310                 315                 320

Tyr Ile Ala Glu Pro Leu Leu Val Val Asn Trp Gln Ser Ser Ile Pro
                325                 330                 335

Ala Val Asp Thr Trp Ile Val Glu Trp Leu Pro Glu Ala Ala Met Ser
            340                 345                 350

Lys Phe Pro Ala Leu Ser Trp Glu Ser Val Ser Gln Val Thr Asn Trp
        355                 360                 365

Thr Ile Glu Gln Asp Lys Leu Lys Pro Phe Thr Cys Tyr Asn Ile Ser
    370                 375                 380

Val Tyr Pro Val Leu Gly His Arg Val Gly Glu Pro Tyr Ser Ile Gln
385                 390                 395                 400

Ala Tyr Ala Lys Glu Gly Thr Pro Leu Lys Gly Pro Glu Thr Arg Val
                405                 410                 415

Glu Asn Ile Gly Leu Arg Thr Ala Thr Ile Thr Trp Lys Glu Ile Pro
            420                 425                 430

Lys Ser Ala Arg Asn Gly Phe Ile Asn Asn Tyr Thr Val Phe Tyr Gln
        435                 440                 445

Ala Glu Gly Gly Lys Glu Leu Ser Lys Thr Val Asn Ser His Ala Leu
    450                 455                 460

Gln Cys Asp Leu Glu Ser Leu Thr Arg Arg Thr Ser Tyr Thr Val Trp
465                 470                 475                 480

Val Met Ala Ser Thr Arg Ala Gly Gly Thr Asn Gly Val Arg Ile Asn
                485                 490                 495

Phe Lys Thr Leu Ser Ile Ser Val Phe Glu Ile Val Leu Leu Thr Ser
            500                 505                 510

Leu Val Gly Gly Gly Leu Leu Leu Ser Ile Lys Thr Val Thr Phe
        515                 520                 525

Gly Leu Arg Lys Pro Asn Arg Leu Thr Pro Leu Cys Cys Pro Asp Val
    530                 535                 540

Pro Asn Pro Ala Glu Ser Ser Leu Ala Thr Trp Leu Gly Asp Gly Phe
545                 550                 555                 560
```

-continued

```
Lys Lys Ser Asn Met Lys Glu Thr Gly Asn Ser Gly Asp Thr Glu Asp
                565             570             575

Val Val Leu Lys Pro Cys Pro Val Pro Ala Asp Leu Ile Asp Lys Leu
            580             585             590

Val Val Asn Phe Glu Asn Phe Leu Glu Val Val Leu Thr Glu Glu Ala
        595             600             605

Gly Lys Gly Gln Ala Ser Ile Leu Gly Gly Glu Ala Asn Glu Tyr Val
    610             615             620

Thr Ser Pro Ser Arg Pro Asp Gly Pro Pro Gly Lys Ser Phe Lys Glu
625             630             635             640

Pro Ser Val Leu Thr Glu Val Ala Ser Glu Asp Ser His Ser Thr Cys
            645             650             655

Ser Arg Met Ala Asp Glu Ala Tyr Ser Glu Leu Ala Arg Gln Pro Ser
        660             665             670

Ser Ser Cys Gln Ser Pro Gly Leu Ser Pro Arg Glu Asp Gln Ala
    675             680             685

Gln Asn Pro Tyr Leu Lys Asn Ser Val Thr Thr Arg Glu Phe Leu Val
    690             695             700

His Glu Asn Ile Pro Glu His Ser Lys Gly Glu Val
705             710             715
```

<210> SEQ ID NO 4
<211> LENGTH: 735
<212> TYPE: PRT
<213> ORGANISM: Macaca sp.

<400> SEQUENCE: 4

```
Met Met Trp Thr Trp Ala Leu Trp Met Phe Pro Leu Leu Cys Lys Phe
1               5               10              15

Gly Leu Ala Ala Leu Pro Ala Lys Pro Glu Asn Ile Ser Cys Val Tyr
            20              25              30

Tyr Tyr Arg Lys Asn Leu Thr Cys Thr Trp Ser Pro Gly Lys Glu Thr
        35              40              45

Ser Tyr Thr Gln Tyr Thr Ala Lys Arg Thr Tyr Ala Phe Gly Lys Lys
    50              55              60

His Asp Asn Cys Thr Thr Ser Ser Ser Thr Ser Glu Asn Arg Ala Ser
65              70              75              80

Cys Ser Phe Phe Leu Pro Arg Ile Thr Ile Pro Asp Asn Tyr Thr Ile
            85              90              95

Glu Val Glu Ala Glu Asn Gly Asp Gly Val Ile Lys Ser Asp Met Thr
        100             105             110

Cys Trp Arg Leu Glu Asp Ile Ala Lys Thr Glu Pro Pro Glu Ile Phe
    115             120             125

Ser Val Lys Pro Val Leu Gly Ile Lys Arg Met Ile Arg Ile Glu Trp
    130             135             140

Ile Lys Pro Glu Leu Ala Pro Val Ser Ser Asp Leu Lys Tyr Ala Leu
145             150             155             160

Arg Phe Arg Thr Val Asn Ser Thr Ser Trp Met Glu Val Asn Phe Ala
            165             170             175

Lys Asn Arg Lys Asp Thr Asn Gln Thr Tyr Asn Leu Met Gly Leu Gln
        180             185             190

Ala Phe Thr Glu Tyr Val Val Ala Leu Arg Cys Ala Val Lys Glu Ser
    195             200             205

Lys Phe Trp Ser Asp Trp Ser Gln Glu Lys Met Gly Met Thr Glu Glu
    210             215             220
```

-continued

```
Glu Ala Pro Cys Gly Leu Glu Leu Trp Arg Val Leu Lys Pro Thr Glu
225                 230                 235                 240

Val Asp Gly Arg Arg Pro Val Arg Leu Leu Trp Lys Lys Ala Arg Gly
            245                 250                 255

Ala Pro Val Leu Glu Lys Thr Leu Gly Tyr Asn Ile Trp Tyr Phe Pro
                260                 265                 270

Glu Asn Asn Thr Asn Leu Thr Glu Thr Val Asn Thr Thr Asn Gln Gln
            275                 280                 285

Leu Glu Leu His Leu Gly Gly Glu Ser Tyr Trp Val Ser Met Ile Ser
        290                 295                 300

Tyr Asn Ser Leu Gly Lys Ser Pro Val Thr Thr Leu Arg Ile Pro Ala
305                 310                 315                 320

Ile Gln Glu Lys Ser Phe Arg Cys Ile Glu Val Met Gln Ala Cys Leu
                325                 330                 335

Ala Glu Asp Gln Leu Val Val Lys Trp Gln Ser Ser Ala Leu Asp Val
            340                 345                 350

Asn Thr Trp Met Ile Glu Trp Phe Pro Asp Met Asp Ser Glu His Pro
        355                 360                 365

Thr Leu Ser Trp Glu Ser Val Ser Gln Ala Thr Asn Trp Thr Ile Gln
370                 375                 380

Gln Asp Lys Leu Lys Pro Phe Trp Cys Tyr Asn Ile Ser Val Tyr Pro
385                 390                 395                 400

Met Leu His Asp Lys Val Gly Glu Pro Tyr Ser Ile Gln Ala Tyr Ala
                405                 410                 415

Lys Glu Gly Ile Pro Ser Lys Gly Pro Glu Thr Lys Val Glu Asn Ile
            420                 425                 430

Gly Val Lys Thr Val Thr Ile Thr Trp Lys Glu Ile Pro Lys Ser Glu
        435                 440                 445

Arg Lys Gly Ile Ile Cys Asn Tyr Thr Ile Phe Tyr Gln Ala Glu Gly
450                 455                 460

Gly Lys Gly Phe Ser Lys Thr Val Asn Ser Ser Ile Leu Gln Tyr Gly
465                 470                 475                 480

Leu Glu Ser Leu Lys Arg Lys Thr Ser Tyr Thr Val Arg Val Met Ala
                485                 490                 495

Ser Thr Ser Ala Gly Gly Ile Asn Gly Thr Ser Ile Asn Phe Lys Thr
            500                 505                 510

Leu Ser Phe Ser Val Phe Glu Ile Ile Leu Ile Thr Ser Leu Ile Gly
        515                 520                 525

Gly Gly Leu Leu Ile Leu Ile Ile Leu Thr Val Ala Tyr Gly Leu Lys
530                 535                 540

Lys Pro Asn Lys Leu Thr His Leu Cys Trp Pro Ser Val Pro Asn Pro
545                 550                 555                 560

Ala Glu Ser Ser Ile Ala Thr Trp Arg Gly Asp Asp Phe Lys Asp Lys
                565                 570                 575

Leu Asn Leu Lys Glu Ser Asp Asp Ser Val Asn Thr Glu Asp Arg Ile
            580                 585                 590

Leu Lys Pro Cys Ser Thr Pro Ser Asp Lys Leu Val Ile Asp Lys Ser
        595                 600                 605

Val Val Asn Phe Gly Asn Val Leu Gln Glu Met Phe Thr Asp Glu Ala
610                 615                 620

Arg Thr Gly Gln Glu Asn Asn Leu Gly Gly Glu Lys Asn Glu Tyr Val
625                 630                 635                 640
```

```
Thr His Pro Phe Arg Ala Asp Cys Pro Leu Gly Lys Ser Phe Glu Glu
                645                 650                 655

Leu Pro Val Ser Pro Glu Ile Pro Pro Arg Lys Ser Gln Tyr Leu Arg
            660                 665                 670

Ser Arg Met Pro Glu Gly Thr Cys Leu Glu Ala Glu Glu Gln Leu Leu
        675                 680                 685

Val Ser Gly Gln Ser Leu Glu Ser Leu Ala Pro Asp His Val Arg Glu
    690                 695                 700

Ala Ala Ala Pro Asn Pro Tyr Leu Lys Asn Ser Val Thr Thr Arg Glu
705                 710                 715                 720

Phe Leu Val Ser Gln Lys Leu Pro Glu His Thr Lys Gly Glu Val
                725                 730                 735

<210> SEQ ID NO 5
<211> LENGTH: 445
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Ile Met Asn Trp Val Arg Gln Ala Pro Gly Gln Gly Leu Glu Trp Met
        35                  40                  45

Gly Leu Ile Asn Pro Tyr Asn Gly Gly Thr Asp Tyr Asn Pro Gln Phe
    50                  55                  60

Gln Asp Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Gly Tyr Asp Asp Gly Pro Tyr Thr Leu Glu Thr Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Asn Phe Gly Thr Gln Thr Tyr Thr Cys Asn Val Asp His
        195                 200                 205

Lys Pro Ser Asn Thr Lys Val Asp Lys Thr Val Glu Arg Lys Ser Cys
    210                 215                 220

Val Glu Cys Pro Pro Cys Pro Ala Pro Pro Val Ala Gly Pro Ser Val
225                 230                 235                 240

Phe Leu Phe Pro Pro Lys Pro Lys Asp Thr Leu Met Ile Ser Arg Thr
                245                 250                 255
```

-continued

Pro Glu Val Thr Cys Val Val Asp Val Ser Gln Glu Asp Pro Glu
            260                 265                 270

Val Gln Phe Asn Trp Tyr Val Asp Gly Val Glu Val His Asn Ala Lys
        275                 280                 285

Thr Lys Pro Arg Glu Glu Gln Phe Asn Ser Thr Phe Arg Val Val Ser
    290                 295                 300

Val Leu Thr Val Val His Gln Asp Trp Leu Asn Gly Lys Glu Tyr Lys
305                 310                 315                 320

Cys Lys Val Ser Asn Lys Gly Leu Pro Ala Pro Ile Glu Lys Thr Ile
                325                 330                 335

Ser Lys Thr Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Met Leu Asp Ser
385                 390                 395                 400

Asp Gly Ser Phe Phe Leu Tyr Ser Lys Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Pro
        435                 440                 445

<210> SEQ ID NO 6
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 6

Asp Ile Gln Met Thr Gln Ser Pro Ser Ser Leu Ser Ala Ser Val Gly
1               5                   10                  15

Asp Arg Val Thr Ile Thr Cys Gln Ala Ser Glu Asp Ile Tyr Ser Phe
            20                  25                  30

Val Ala Trp Tyr Gln Gln Lys Pro Gly Lys Ala Pro Lys Leu Leu Ile
        35                  40                  45

Tyr Asn Ala Gln Thr Glu Ala Gln Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Tyr Asp Ser Pro Leu
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

```
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
        195                 200                 205
Phe Asn Arg Gly Glu Cys
    210
```